(12) United States Patent
Nepo

(10) Patent No.: US 10,373,478 B2
(45) Date of Patent: *Aug. 6, 2019

(54) DISSEMINATING INFORMATION TO FACILITATE USER SAFETY

(71) Applicant: Michael Nepo, Woodside, NY (US)

(72) Inventor: Michael Nepo, Woodside, NY (US)

(73) Assignee: Life Protector, LLC, Woodside, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,172

(22) Filed: Sep. 12, 2016

(65) Prior Publication Data
US 2016/0379479 A1 Dec. 29, 2016

Related U.S. Application Data

(63) Continuation of application No. 14/587,140, filed on Dec. 31, 2014, now Pat. No. 9,443,415, which is a (Continued)

(51) Int. Cl.
*G08B 15/00* (2006.01)
*G08B 21/04* (2006.01)
(Continued)

(52) U.S. Cl.
CPC .......... *G08B 25/016* (2013.01); *G08B 15/004* (2013.01); *G08B 25/001* (2013.01);
(Continued)

(58) Field of Classification Search
None
See application file for complete search history.

(56) References Cited

U.S. PATENT DOCUMENTS

| 4,465,464 A | 8/1984 | Schoenberg |
| 4,871,351 A | 10/1989 | Feingold |

(Continued)

FOREIGN PATENT DOCUMENTS

| GB | 2457312 | 8/2009 | |
| JP | 10-145734 A | * 5/1998 | ............. H04N 5/915 |
| JP | 10145734 | 5/1998 | |

*Primary Examiner* — Dakshesh D Parikh
(74) *Attorney, Agent, or Firm* — Fish & Richardson P.C.

(57) ABSTRACT

A method for disseminating information regarding a problem and administering medical interventions comprises providing a mobile device wirelessly connectable to a network, receiving and storing contact information corresponding to a designated list of information recipients, receiving, via the mobile device and via the wireless trigger transmitting to the mobile device, a signal from a user indicating the problem, receiving, via the mobile device, information regarding the problem, transmitting an indication of the problem to a rescue clearinghouse via the network, prompting a participant of the rescue clearinghouse, different from the user, to make a decision about a course of action regarding the problem, and at least one of transmitting the information regarding the problem to the information recipients from the designated list and transmitting the information regarding the problem to a government rescue organization, based at least in part on the decision.

23 Claims, 14 Drawing Sheets

Related U.S. Application Data continuation-in-part of application No. 14/043,531, filed on Oct. 1, 2013, now abandoned, which is a continuation-in-part of application No. 13/928,110, filed on Jun. 26, 2013, now abandoned.

(60) Provisional application No. 61/761,304, filed on Feb. 6, 2013.

(51) Int. Cl.
    *G08B 25/00*     (2006.01)
    *G08B 25/01*     (2006.01)
    *G08B 25/10*     (2006.01)
    *G08B 29/12*     (2006.01)

(52) U.S. Cl.
    CPC ........... *G08B 25/006* (2013.01); *G08B 25/10* (2013.01); *G08B 21/0453* (2013.01); *G08B 25/009* (2013.01); *G08B 29/12* (2013.01)

(56) References Cited

U.S. PATENT DOCUMENTS

| | | |
|---|---|---|
| 5,045,839 A | 9/1991 | Ellis |
| 2004/0043779 A1 | 3/2004 | Oliver |
| 2005/0056674 A1 | 3/2005 | Renn |
| 2005/0131465 A1 | 6/2005 | Freeman et al. |
| 2005/0228297 A1 | 10/2005 | Banet |
| 2005/0275542 A1* | 12/2005 | Weekes ............. G08B 21/0286 340/573.1 |
| 2006/0201964 A1* | 9/2006 | DiPerna .................... F41H 9/10 222/78 |
| 2006/0267760 A1 | 11/2006 | Shecter |
| 2007/0080217 A1 | 4/2007 | Brabant |
| 2007/0127704 A1 | 6/2007 | Marti |
| 2007/0218895 A1 | 9/2007 | Saito et al. |
| 2008/0133930 A1 | 6/2008 | Moshir |
| 2008/0182547 A1* | 7/2008 | Glover ................... H04M 11/04 455/404.1 |
| 2008/0214142 A1 | 9/2008 | Morin |
| 2010/0156626 A1 | 6/2010 | Story |
| 2010/0161149 A1 | 6/2010 | Nguyen et al. |
| 2010/0245585 A1 | 9/2010 | Fisher et al. |
| 2010/0279647 A1* | 11/2010 | Jacobs .................... H04W 4/22 455/404.1 |
| 2010/0311387 A1 | 12/2010 | Bartholdson |
| 2010/0324384 A1 | 12/2010 | Moon et al. |
| 2011/0111728 A1* | 5/2011 | Ferguson .......... H04M 1/72541 455/404.2 |
| 2011/0230204 A1* | 9/2011 | Root ..................... G01W 1/00 455/456.1 |
| 2012/0154148 A1 | 6/2012 | Mohandes |
| 2013/0238700 A1 | 9/2013 | Papakipos |

* cited by examiner

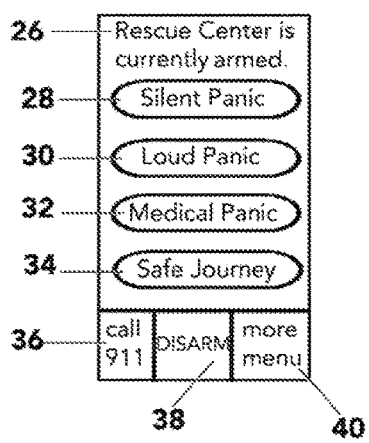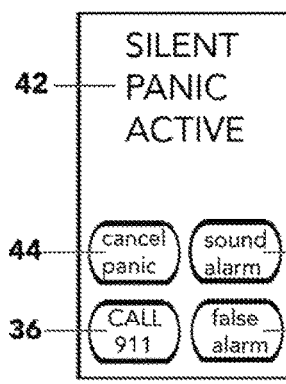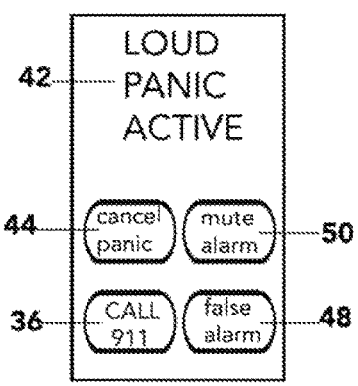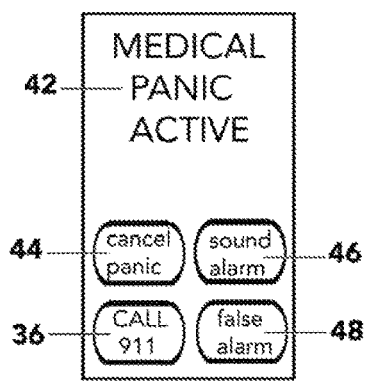

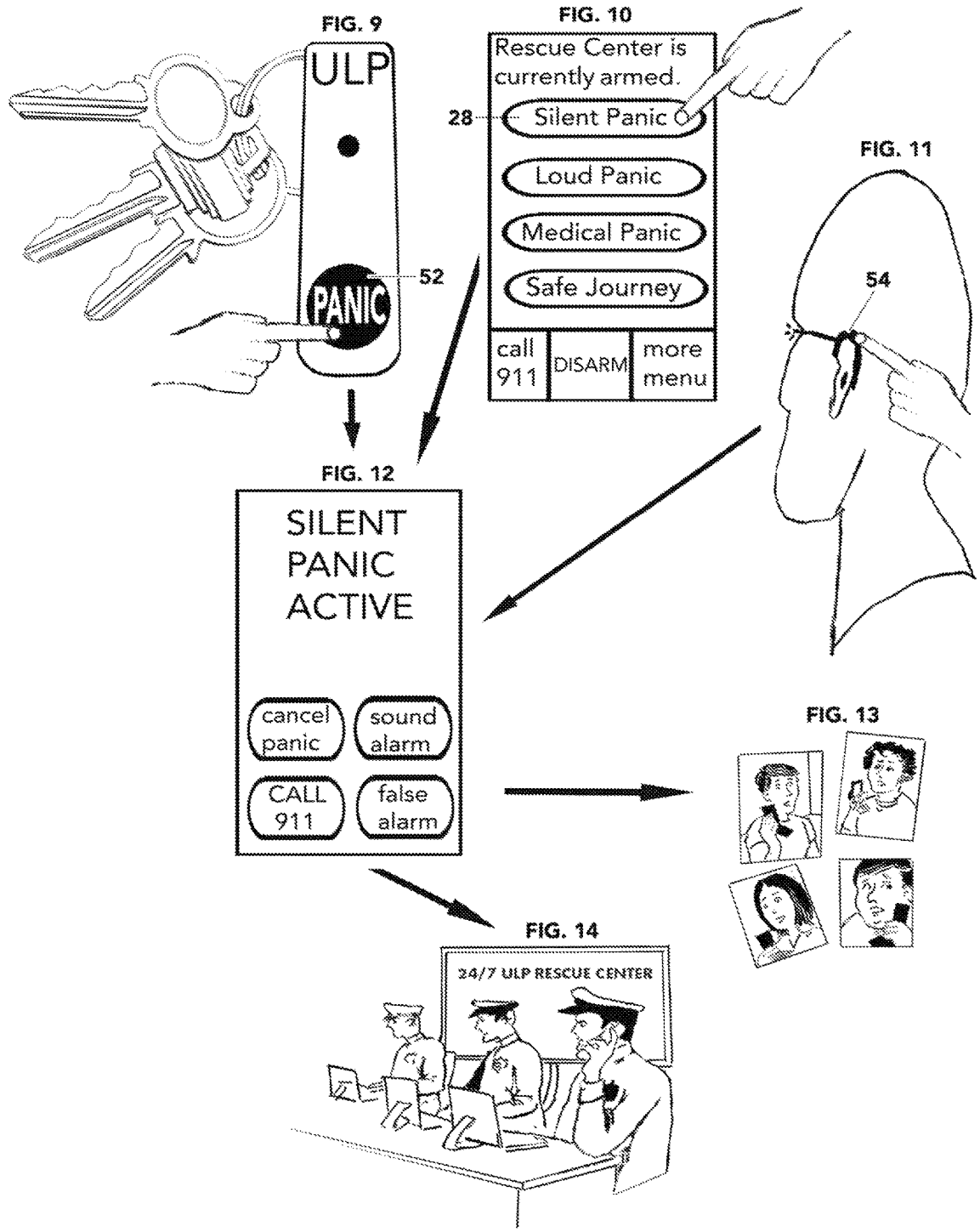

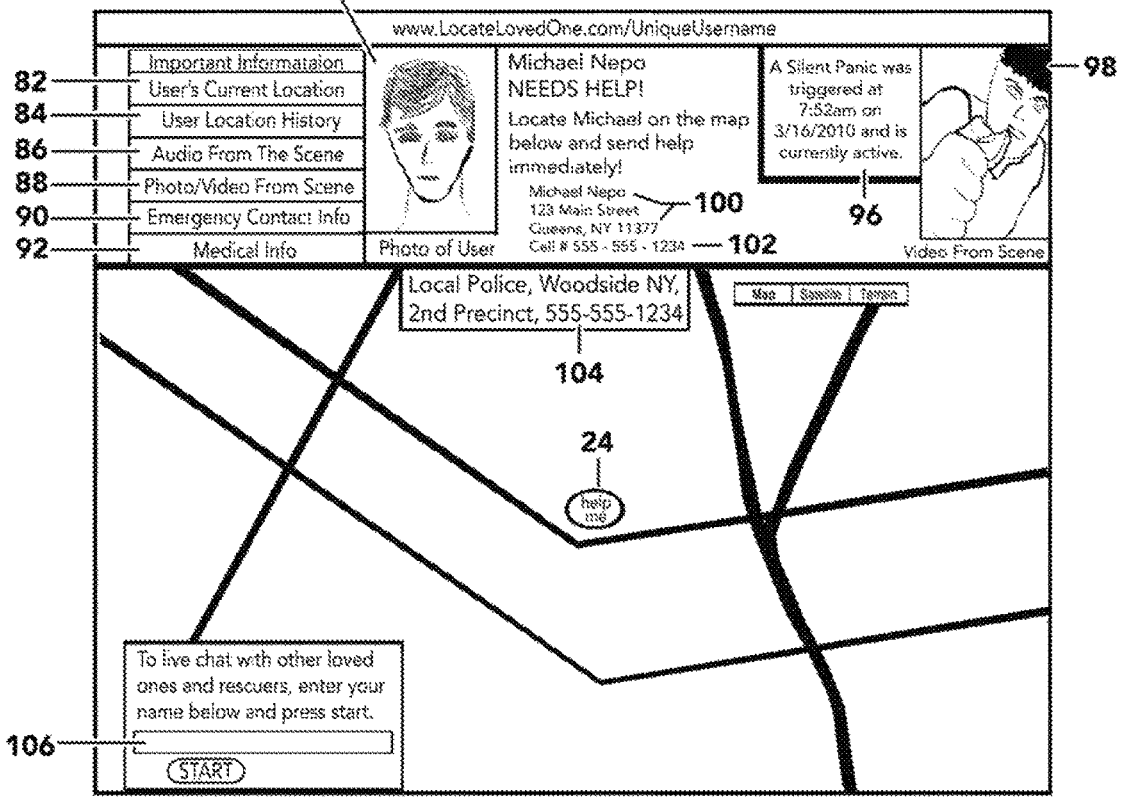
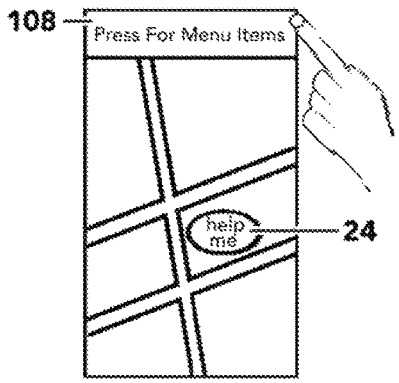

FIG. 29

| Latitude | Longitude | Address | Date/Time |
|---|---|---|---|
| 40.76656 | -73.90628 | 123 Main St. Queens, NY | 7:02AM on 12/18/2010 |
| 40.76656 | -73.90628 | 123 Main St. Queens, NY | 7:02AM on 12/18/2010 |
| 40.76656 | -73.90628 | 123 Main St. Queens, NY | 7:01AM on 12/18/2010 |
| 40.76656 | -73.90628 | 123 Main St. Queens, NY | 7:01AM on 12/18/2010 |
| 40.76656 | -73.90628 | 123 Main St. Queens, NY | 7:00AM on 12/18/2010 |

FIG. 30

Audio from Annie Goodman.
Recording began at 3:11 am on 12/18/2010.

PANIC IS ACTIVE.

New audio is streaming now.

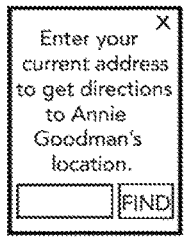

Enter your current address to get directions to Annie Goodman's location.

[FIND]

FIG. 32

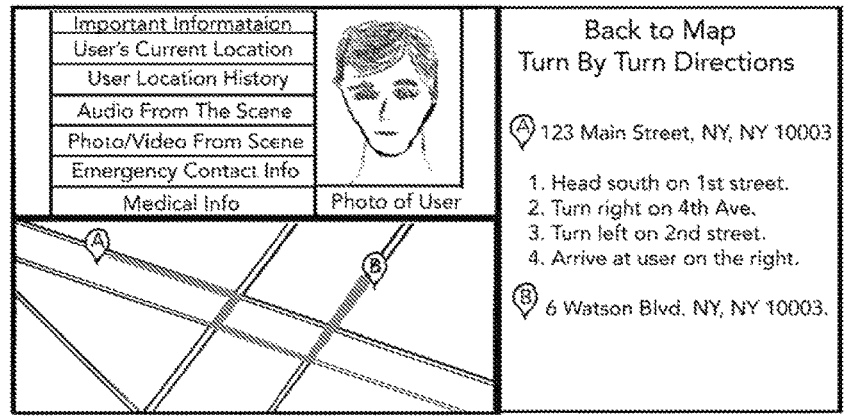

| Important Information |
| User's Current Location |
| User Location History |
| Audio From The Scene |
| Photo/Video From Scene |
| Emergency Contact Info |
| Medical Info | Photo of User |

Back to Map
Turn By Turn Directions

Ⓐ 123 Main Street, NY, NY 10003

1. Head south on 1st street.
2. Turn right on 4th Ave.
3. Turn left on 2nd street.
4. Arrive at user on the right.

Ⓑ 6 Watson Blvd. NY, NY 10003.

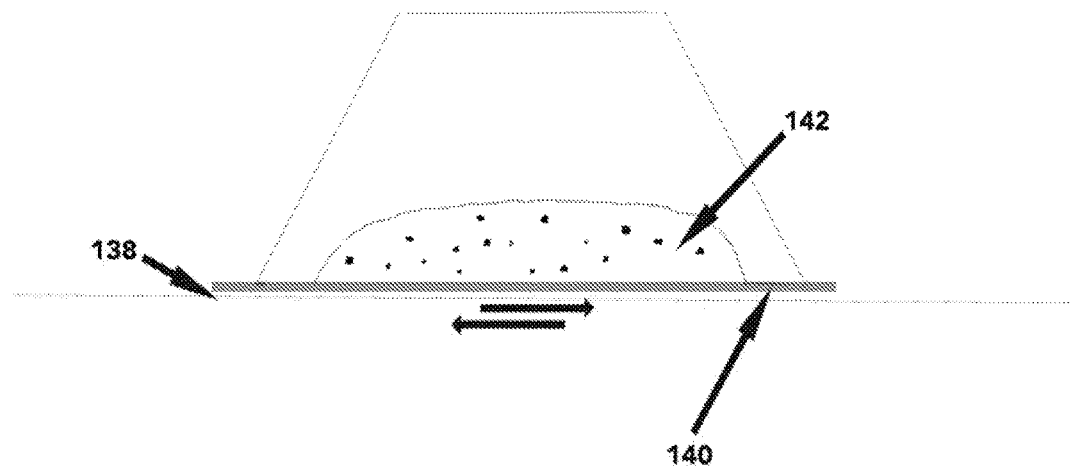
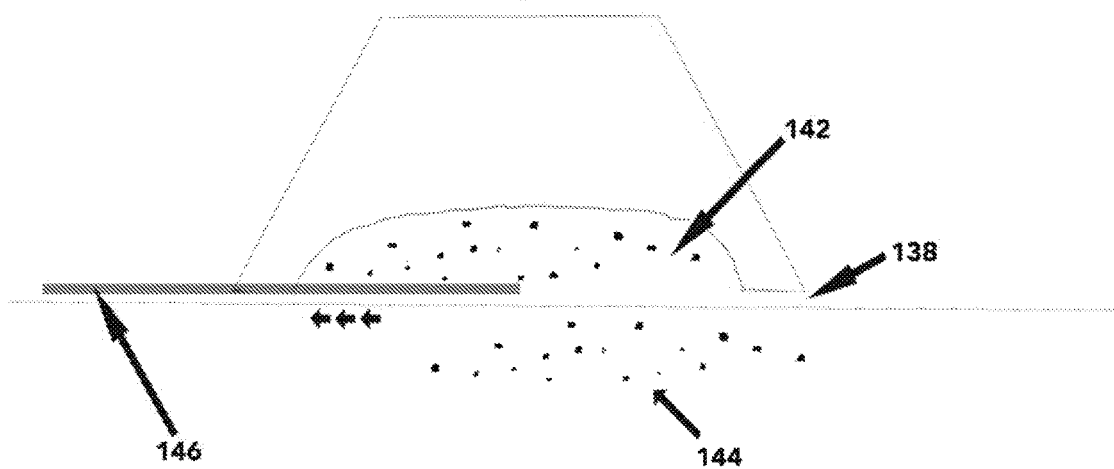

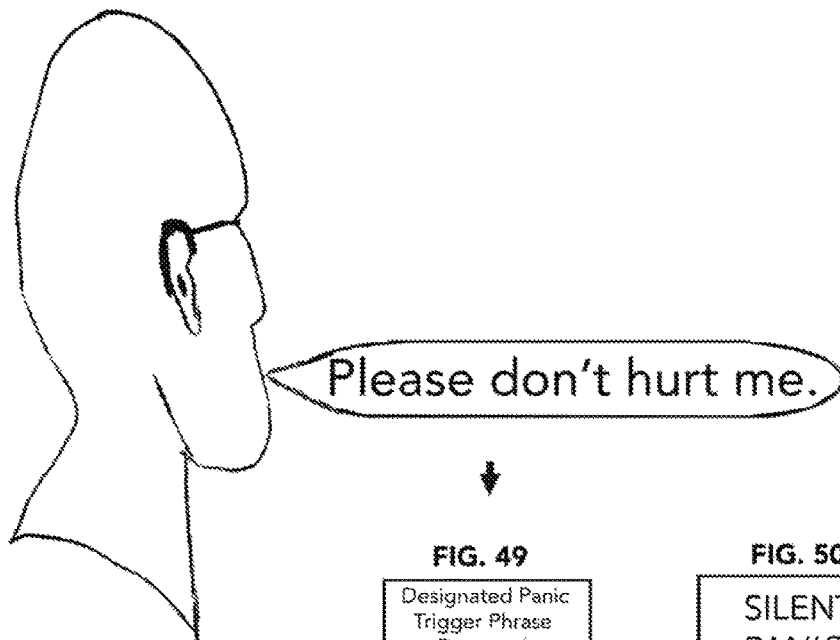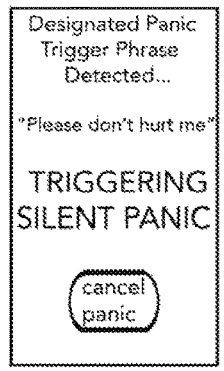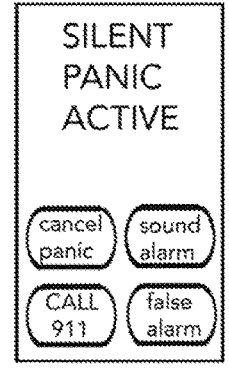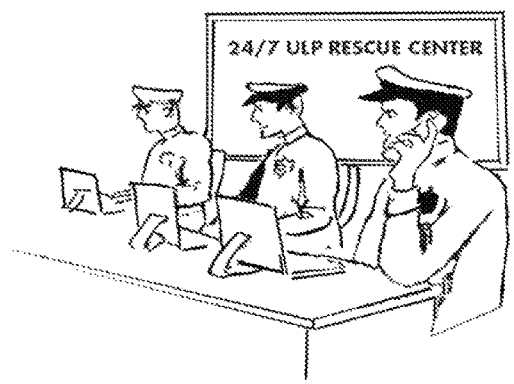

DISSEMINATING INFORMATION TO FACILITATE USER SAFETY

REFERENCE TO RELATED APPLICATIONS

This application is a continuation of U.S. Non-Provisional patent application Ser. No. 14/587,140 (now U.S. Pat. No. 9,443,415) filed Dec. 31, 2014, which is a continuation-in-part claiming the benefit of U.S. Non-Provisional patent application Ser. No. 14/043,531 filed Oct. 1, 2013, which is a continuation-in-part claiming the benefit of U.S. Non-Provisional patent application Ser. No. 13/928,110, filed Jun. 26, 2013, which claims the benefit of Provisional Patent Application No. 61/761,304, filed Feb. 6, 2013. The disclosures of the prior applications are considered part of (and are incorporated by reference in) the disclosure of this application.

BACKGROUND OF THE INVENTION

Throughout history, millions of people faced life-threatening crises such as abductions, rape, sudden medical crises, car-jackings, robberies, and countless other dangerous predicaments. When a person found themselves in such a situation, it was impossible to instantly and discreetly alert loved ones and professional rescuers to the crisis, without alerting a potential attacker or abductor to the rescue attempt, and it was impossible to discreetly provide rescuers with data such as audio, video, geographical location, and instant communication amongst the various rescuers, needed to understand the nature of the crisis in order to enable rescuers to locate and rescue the user. Often, police lack the vital information and evidence needed to identify, capture and prosecute attackers, or to understand the detailed circumstances of any crisis from afar. Safety systems which require the user to engage in a verbal conversation with the rescuers are dangerous and not usable in a situation such as abduction, because the attacker will hear the discussion with the dispatcher and terminate the communication. Safety systems which require users to interact with a smart phone screen to trigger a panic are impossible to discreetly and rapidly use during a sudden attack, because it takes too long and is too indiscreet for users to: A) awaken the phone screen, B) unlock the screen, C) locate the application, D) launch the application, and finally, E) trigger a panic within the application. No attacker would allow a user to retrieve their phone from their pocket and do the above actions during an attack.

Even if people possessed a physical panic trigger device which didn't require the user to interact with their phone screen in order to activate a panic, the user was still typically required to move their limbs and hands in such a manner as to be easily detected by attackers. Panic trigger devices are not readily available to people at all times including while in bed or in the shower. If an attacker were to suddenly appear behind someone and hold a knife to their throat, the victim previously had no ability to remain still while discreetly summoning help without alerting the attacker to the panic-triggering. If a person possessed a physical panic trigger device, if the person forgot to recharge or otherwise replenish the power for the device, the person was not automatically reminded of the low power status, hence the panic trigger would not be available for the person to use during an unexpected crisis. If a person was on a journey alone and became unconscious, there was very little likelihood that they would have been rescued. Victims of rape do not have available ways to deter the rapist from proceeding with an attack by convincing the attacker that their identity and location is now known to the authorities. If a person were to experience sudden cardiac arrest, there is a high likelihood that the person would die without immediate defibrillation. If a person needs a dose of medicine, it has been difficult for many people to administer the correct dosage at the correct times, particularly if a medical emergency rendered the user unconscious. If a person were to suffer from a seizure, stroke or other brain-related crisis, it has not been possible to instantly notify rescuers of the crisis, and it was not possible to rapidly and automatically administer medicine needed to address the crisis.

When a person embarks on any journey alone, including journeys on foot and in a car, if a sudden crisis were to emerge which caused the person to lose consciousness, subsequently causing the person to stop progressing towards their destination, it was not previously possible for help to be automatically summoned to the person's location. Further, when people embark on any journey, if they were suddenly abducted and forcibly taken in a direction other than towards their intended destination, it currently is not possible for the deviation from the planned route to be automatically detected or for the detected deviation to automatically summon rescuers to the person's location. Further, when people are violently impacted by a projectile, fall to the ground, crash their automobile, or experience any dangerously abnormal level of g-forces and rapid deceleration, it was not previously possible for a portable and discreet safety system to automatically detect the violent movements and to automatically summon medical assistance to the location of an unresponsive user.

As can be seen, there is a need for solutions to these and other problems.

SUMMARY OF THE INVENTION

In one aspect of the present invention, a method for disseminating information regarding a problem, comprises: providing a mobile device wirelessly connectable to a network; receiving and storing contact information corresponding to a designated list of information recipients; receiving, via the mobile device, a signal indicating the problem; receiving, via the mobile device, information regarding the problem; transmitting an indication of the problem to a rescue clearinghouse via the network; prompting a participant of the rescue clearinghouse, different from the user, to make a decision about a course of action regarding the problem; and at least one of transmitting the information regarding the problem to the information recipients from the designated list and transmitting the information regarding the problem to a government rescue organization, based at least in part on the decision.

In another aspect of the present invention, a method for disseminating information regarding a problem further comprising a plurality of wireless panic trigger devices each comprising a button, wherein receiving the signal indicating the problem is activated by the user at least double pressing the button on one of the panic trigger devices, which signals the mobile device wirelessly.

In another aspect of the present invention, a method for disseminating information regarding a problem further comprising a ring comprising a button, wherein receiving the signal indicating the problem is activated by the user at least double pressing the button on the ring, which signals the mobile device wirelessly.

In another aspect of the present invention, methods and systems for administering medical interventions.

In another aspect of the present invention, a method for disseminating information regarding a problem comprises: providing a mobile device wirelessly connectable to a network; receiving and storing contact information corresponding to a designated list of information recipients; receiving, via the mobile device, a signal from a user indicating a safe time period; measuring an elapsing of the safe time period; and either a) or b) but not both: a) within the safe time period, receiving a completion indication from the user; b) transmitting an indication of a problem to a rescue clearinghouse via the network; prompting an operator of the rescue clearinghouse, different from the user, to make a decision about a course of action regarding the problem; and at least one of transmitting the information regarding the problem to the information recipients from the designated list and transmitting the information regarding the problem to a government rescue organization, based at least in part on the decision.

In another aspect of the present invention, a method for disseminating information regarding a problem further comprising a head mounted camera comprising a button, wherein receiving the signal indicating the problem is activated by the user double pressing the button on the head mounted camera, which signals the mobile device wirelessly.

In another aspect of the present invention, a method for disseminating information regarding a problem wherein receiving the signal indicating the problem is activated by the mobile device detecting a preprogrammed spoken phrase.

In another aspect of the present invention, a method for disseminating information regarding a problem further comprising a plurality of wireless panic triggers, wherein receiving the signal indicating the problem is activated by the wireless panic trigger devices detecting a preprogrammed spoken phrase.

In another aspect of the present invention, a method for disseminating information regarding a problem wherein at least one of the mobile device, the panic ring, the attachable panic key fob and other wirelessly connected panic trigger devices may contain a vibrate function in order to automatically notify the user of information pertinent to the problem.

In another aspect of the present invention, a method for disseminating information regarding a problem further comprising receiving and storing a specified area, wherein receiving the signal indicating the problem is activated by the mobile device either entering, not entering, exiting or not exiting the specified area(s) at the designated time(s).

In another aspect of the present invention, a method for disseminating information regarding a problem further comprising the step of providing a g-force detector attached to the cell phone; and receiving and storing information of a threshold g-force amount, wherein receiving the signal indicating the problem comprises the mobile phone reaching the threshold g-force amount.

In another aspect of the present invention, a method for disseminating information regarding a problem further comprising providing an accelerometer connected to the mobile device, wherein the signal indicating the problem is activated by reaching a threshold change in the rate of speed.

In another aspect of the present invention, a method for disseminating information regarding a problem further comprising providing a family plan comprising a plurality of mobile devices owned by multiple members of the same family.

In another aspect of the present invention, a method for disseminating information regarding a problem further comprising the step of detecting the location of the plurality of mobile devices on the family plan and displaying the locations on a shared family Internet website.

In another aspect of the present invention, a method for disseminating information regarding a problem further comprising providing detailed monitoring of the locations and timing of a plurality of consenting users' scheduled journeys and destinations, wherein receiving the signal indicating the problem is activated by the mobile device at least one of arriving at a designated location at the designated time, not arriving at a designated location at the designated time, departing from a designated location at the designated time, and not departing from a designated location at the designated time, wherein users who know the password retain the option to stop all monitoring.

In another aspect of the present invention, a method for disseminating information regarding a problem further comprises a cycle mode, wherein as the cycle mode is active, the user arranges to confirm that they are OK at regular designated intervals, further comprising the mobile device and wireless trigger devices vibrating to remind the user to confirm their wellbeing via the mobile device and wireless trigger devices, and when the user fails to transmit the confirmation, thereby prompting the designated message recipients, different from the user, to make a decision about a course of action regarding the problem; and at least one of transmitting the information regarding the problem to the information recipients from the designated list and transmitting the information regarding the problem to a government rescue organization, based at least in part on the decision.

In another aspect of the present invention, a method for disseminating information regarding a problem further comprising providing an institutional mode comprising a plurality of mobile devices owned by numerous different members of an institutional community, enabling institutional security managers to detect problems and communicate with individual community members, further comprising the ability to oversee and detect problems from among thousands of institutional community members on a shared institutional Internet website.

In another aspect of the present invention, a method for disseminating information regarding a problem further comprising providing a recording device connected to at least one of the plurality mobile devices and configured to record at least one of audio, video, and image; and recording at least one of audio, video, and image in real time via the recording device to produce recording information, wherein the information is displayed on the shared family Internet website.

In another aspect of the present invention, a method for disseminating information regarding a problem wherein the signal indicating the problem activates a silent panic or a loud panic, wherein the silent panic comprises transmitting an indication of the problem to a rescue clearinghouse via the network without detection, wherein the loud panic comprises transmitting an indication of the problem to a rescue clearinghouse via the network while the mobile device produces at least one of a loud spoken warning, a loud siren and an emitting light.

In another aspect of the present invention, a method for disseminating information regarding a problem further comprises a designated number of button presses on the wireless panic trigger device causing the mobile device to trigger the designated panic mode, wherein any mode available within the present invention may be activated by pressing the button the designated number of times.

In another aspect of the present invention, a method for disseminating information regarding a problem wherein activating the loud panic comprises selecting a loud panic button icon displayed on a home screen of the mobile device.

In another aspect of the present invention, a method for disseminating information regarding a problem further comprises a bad date alert, wherein the bad date alert comprises at least one of causing a phone to ring loudly and notifying designated contacts that the user is having a bad date or other problem, wherein the bad date alert further comprises notifying the designated contacts that the user perceives the problem to be not physically dangerous.

In another aspect of the present invention, a method for disseminating information regarding a problem further comprises providing an option for users to create multiple customized panic modes, wherein users with a distinct preexisting medical condition such as asthma may create a customized asthma attack panic mode to be triggered at least one of after the wireless trigger button is pressed the designated number of times at least twice, and after selecting the customized asthma attack panic option on the application screen, thereby informing rescuers as to the nature of the problem without requiring the user to speak.

In another aspect of the present invention, a method for disseminating information regarding a problem further comprises providing a health monitor via the ring device, wherein the ring automatically gathers numerous health statistics during non-panics in order to monitor at least one of pulse, activity levels, blood pressure, pedometer statistics, sweat analysis, sleep analysis, and other health related tests, further comprising providing the resulting data from the health monitoring on an Internet website, and also transmitting the information via email and other available means of electronic communication to the user and to the designated contacts.

In another aspect of the present invention, a method for disseminating information regarding a problem further comprises providing a buffer mode in the application, wherein during a safe period with buffer mode active, the mobile device records and locally stores at least one of location information, video information, audio information and health monitor information for as long as the buffer mode remains active, further comprising deleting the earliest recorded information after the recording reaches the designated length of time, further comprising the mobile device continuously replacing the earliest deleted information with the newly recorded information, to thereby provide the rescuers with at least one of recorded location information, audio information, video information and health monitor information from the time immediately preceding the signal transmitting an indication of the problem, in order to provide rescuers with details of the circumstances leading up to the problem.

In another aspect of the present invention, a method for disseminating information regarding a problem, comprises: providing a mobile device wirelessly connectable to a network; receiving and storing contact information corresponding to a designated list of information recipients; receiving, via the mobile device, coordinates of an intended destination; tracking the movements of the mobile device from a current location to the intended destination; transmitting an indication of a problem to a rescue clearinghouse via the network when the mobile device is either no longer moving or is deviating from routes which lead to the intended destination; prompting a participant of the rescue clearinghouse, different from the user, to make a decision about a course of action regarding the problem; and at least one of transmitting the information regarding the problem to the information recipients from the designated list and transmitting the information regarding the problem to a government rescue organization, based at least in part on the decision.

In another aspect of the present invention, a method for disseminating information regarding a problem further comprising providing user with a decoy phone separate from the phone containing the application of the present invention, wherein the user allows the decoy phone to be confiscated by an attacker, thereby enabling the user to continue transmitting data to the rescue clearinghouse due to the attacker's erroneous belief that the active phone has been confiscated and rendered inoperable.

These and other features, aspects and advantages of the present invention will become better understood with reference to the following drawings, description and claims.

BRIEF DESCRIPTION OF THE DRAWINGS

FIG. 5 is an exemplary representation of the application home screen of the present invention;

FIG. 6 is an exemplary representation of the application screen which appears after a silent panic of FIG. 5 has been triggered;

FIG. 7 is an exemplary representation of the application screen which appears after a loud panic of FIG. 5 has been triggered;

FIG. 8 is an exemplary representation of the application screen which appears after a medical panic of FIG. 5 has been triggered;

FIG. 9 is a perspective view of a designated physical panic trigger device of the present invention;

FIG. 10 is an exemplary representation of the user triggering silent panic from FIG. 5;

FIG. 11 is a perspective view of a user selecting silent panic on an exemplary ear-mounted video camera of the present invention;

FIG. 12 is an exemplary representation of the application screen which appears after a silent panic of FIG. 9 through 12 has been triggered;

FIG. 13 is an exemplary representation of the user's designated emergency contacts receiving a signal activated by the silent panic of FIG. 9 through 12;

FIG. 14 is an exemplary representation of a designated Rescue Center receiving a signal activated by the silent panic of FIG. 9 through 12;

FIG. 26 is an exemplary representation of the rescue website component of the present invention;

FIG. 27 is an exemplary representation of the rescue website displayed on a smart phone or other internet-enabled device;

FIG. 28 is an exemplary representation of the present invention after a user selects press for menu items of FIG. 27;

FIG. 29 is an exemplary representation of the present invention after a user selects the user location history button of FIG. 28;

FIG. 30 is an exemplary representation of the present invention after a user selects the audio from scene button of FIG. 28;

FIG. 31 is an exemplary representation of the present invention after a user selects the help me button of FIG. 28;

FIG. 32 is an exemplary representation of the present invention providing directions to the user after a different user enters a street address into the field described in FIG. 31;

FIG. 36 is an exemplary representation of the transdermal medicine distribution patch with the medicine shield closed, sealing off the medicine reservoir;

FIG. 37 is an exemplary representation of the transdermal medicine distribution patch of FIG. 36 with the medicine shield open, exposing the medicine reservoir;

FIG. 47 is an exemplary representation of user speaking a designated phrase in order to trigger a silent panic;

FIG. 48 is an exemplary representation of an attacker threatening the user of FIG. 47;

FIG. 49 is an exemplary representation of the smart phone detecting the spoken designated panic trigger phrase, causing it to trigger a silent panic;

FIG. 50 is an exemplary representation of a silent panic triggering as a result of FIG. 49;

FIG. 51 is an exemplary representation of the user's designated emergency contacts receiving a signal activated by the silent panic of FIG. 50;

FIG. 52 is an exemplary representation of a designated rescue center receiving a signal activated by the silent panic of FIG. 50;

DETAILED DESCRIPTION OF THE INVENTION

Figure 1:
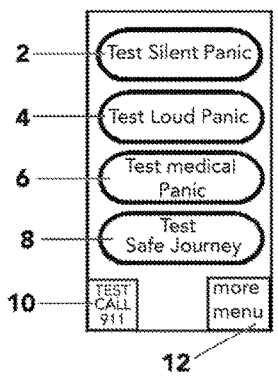
FIG. 1 is an exemplary representation of the test panic home screen within the smart phone application.

The following detailed description is of the best currently contemplated modes of carrying out exemplary embodiments of the invention. The description is not to be taken in a limiting sense, but is made merely for the purpose of illustrating the general principles of the invention.

The present invention is a safety/rescue system designed to facilitate the user's survival and rescue from any number of predicaments ranging from uncomfortable situations to life-threatening crises. The present invention may be referenced as the Ultimate Life Protector (ULP). In certain embodiments, the components of the present invention may include a smart phone software application, a panic button that may be a Bluetooth® or other wireless enabled panic button which sends panic signals to the smart phone application, a server/cloud database, a rescue website, a dedicated 24/7 rescue center and additional optional physical accessories.

In all cases herein, the following may describe the formula for entering text within the websites, emails, applications, and the like, when words are shown in between the following symbols "[ ]". In such cases, the content may be an unknown variable, and may be meant to be automatically inserted when the variable becomes known. For instance, "Hi [EMERGENCY CONTACT'S NAME]," In this example, the applicable message recipient's name may be automatically inserted within the [ ]. For instance, "Hi Bob Johnson."

In certain embodiments, the software application for smart phones and portable Internet-enabled devices may be created in several coding languages required to be compatible with all widely used smart phone operating systems and all widely used operating systems for Internet-enabled devices, including but not limited to: Android, iOS, Blackberry, Java, Windows, Symbian, Bada, Maemo, Moblin, MeeGo, Palm, webOS and the like. When new smart phone operating systems become widely used, the software code may be translated into the new language, enabling the algorithm of the present invention to function on the new smart phones and other Internet-enabled devices. Regardless of the operating system, the algorithmic functions of the present invention may be utilized on all suitable smart phones and Internet-enabled devices.

The following includes exemplary embodiments of the application of the algorithm of the present invention. After installation, during the first launch of ULP, the user may be prompted to do the following tasks below:

If the user quits the application before entering the required information, when the user re-launches the application, the user may be automatically returned to the signup process described below, and the same continues to happen after application launch until the user enters certain identifying information. For example, the user may enter a unique username, their own contact info, and the contact information for at least one emergency contact who may be invited to participate to help facilitate the user's rescue during a predicament.

The following may include the steps of an exemplary signup process. The user may be prompted to select a unique user name. If the entered user name is already in use, the user may be prompted to create a unique user name. The user name may be the element that makes the user's web link unique. The user may be prompted to enter their own personal contact info, such as but not limited to, their cell phone number, email address, and physical home address. The user may be prompted to take a picture of themselves, so rescuers can know what the user looks like during the rescue. The user may be prompted to enter at least one emergency contact, and users may be encouraged to enter ten or more emergency contacts. The emergency contacts may include trustworthy loved ones, campus security if applicable, a doctor if applicable, with phone numbers capable of receiving SMS in addition to email messages. At the end of this initial sign up process, after all the user's information has been entered, the user may be sent to the test panic screen. A pop up message may inform the user that they must trigger a designated number of test panics more than one, before gaining the ability to trigger a real panic. If the user quits the application at this time, before the designated number of test panics have been triggered, when the user re-launches the ULP application, the user may be returned to the test panic screen.

In certain embodiments, until the user triggers the designated mandatory minimum number of test panics required of all users who are just beginning to use ULP, the user may be brought to the test panic mode each time they launch the application. This may ensure that all users have at least several experiences using the present invention in a test mode, to gain a basic understanding of how it functions before attempting to trigger a real panic during a true emergency. When the user triggers the very first test panic, all emergency contacts may be sent an email which formally invites them to participate as this user's emergency contact in case of a crisis.

An example of the invitation email may include the following:
Hi [RECIPIENT'S NAME],
It's [NAME OF USER] here. I'm writing because I just signed up for a safety/rescue service called Ultimate Life Protector®. I need to enter contact info for 10 emergency contacts and I'm hoping you won't mind being one of them. What I need is very simple. If I launch a panic to indicate that I'm in great danger, my contacts (like you) will receive an SMS text which has a web link. All I need you to do is to call the nearest 911 precinct to my location, and tell them to go to that link. The phone number for the nearest 911 precinct to me is available right at the top of the website. Simple! The link is http://www.LocateLovedOne.com/ [UNIQUE USER NAME]. You can also click the link yourself right on your phone, to see where I am, hear live audio and much more.
Professional rescuers like the police can use this web link to track my location, so they can rescue me. If you have any questions or you don't want to be one of my emergency contacts, please let me know.
Thanks either way!
[User's Full Name]
[User's phone #]
[user's email address]
Learn more about this safety/rescue service and sign up yourself at http://www.UltimateLifeProtector.com After the first test panic described above, during which time the emergency contacts may be first invited via email and SMS to participate with the user, the user may be encouraged to remain in test mode for an extended period, and to continue to trigger test panics. Users may be encouraged to frequently trigger test panics before ever using ULP in a truly dangerous situation. ULP may encourage an extended period of testing in order to help users and their emergency contacts to learn all about the various functions and features within the present invention, without contacting the authorities, or falsely alerting personal emergency contacts to an ostensible crisis when, in truth, the user may currently be safe and may be testing and experimenting with the system.

Figure 2:
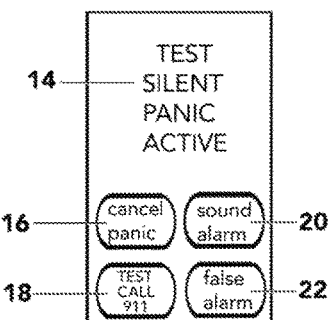
FIG. 2 is an exemplary representation of the application screen shown after a test silent panic of FIG. 1 has been triggered.

An exemplary embodiment of the dedicated test panic screen is illustrated in FIG. 1. In certain embodiments, the dedicated test panic screen may contain six main button options, which may include but are not limited to, test silent panic 2, test loud panic 4, test medical panic 6, test safe journey 8, test call 911 10, and more menu 12. If the user triggers a test silent panic 2, the active panic screen 14 illustrated in FIG. 2 may appear, which may display the current panic status, and may contain four main button options, which may include but are not limited to, cancel panic 16, test call 911 18, sound alarm 20, and false alarm 22. In addition to accessing the test panic options via the above dedicated test panic screen, after the user has triggered the mandatory minimum number of test panics, users may retain the option to re-enter test mode voluntarily, and while test mode may be active the user may press any applicable physical panic buttons the designated number of times, and may trigger a panic due to a deviation in a journey during test mode, and all other normal modes may be triggered within test mode, including triggering any test panic from the application screen.

After the user has triggered the designated mandatory minimum number of test panics required for users as they initially begin to use the present invention, they may henceforth be authorized to trigger a real, non-test panic. In such a case after the user has triggered the mandatory number of test panics, and test panic mode may be currently active but the user unexpectedly determines that they may be facing a truly dangerous crisis, the user may override any presently active mode by pressing the wireless panic button on any applicable wireless device a designated number of times, more than twice. For instance, the user may press the panic button four times in order to trigger a different panic signal such as a real, non-test silent panic, in addition to several other potential triggering options which may be selected when the user presses the panic button a different, designated number of times. As mentioned above, the user may not initially have the ability to override the requirement to trigger a designated minimum number of test panics before triggering a real panic. The user's ability to override test mode by clicking the button a designated number of times may only be an option for users who have already triggered more than the designated number of minimum, mandatory educational test panics when users initially begin to use the present invention.

The functions of the test silent panic active screen 14 may act as it normally would during a real panic, except the rescue center may never be contacted during a test panic, and during a test panic, the panic SMS and email messages may convey that this is not a real emergency. The test panic may be used to give the user and the emergency contacts experience using the present invention, so they are prepared to assist with a rescue in case of a real emergency. Also, test panic may allow the user to confirm that all of the phone numbers and email addresses for emergency contacts are current and correct. Recipients receive test panic messages, at which time they may click directly on the user's web link, with which they can repeatedly visit the website, to fully to understand all the various features available to aid with a rescue. Emergency contacts may click the web link on their Internet-enabled smart phones, as well as from within email on their desktop, laptop and tablet devices.

Figure 3:
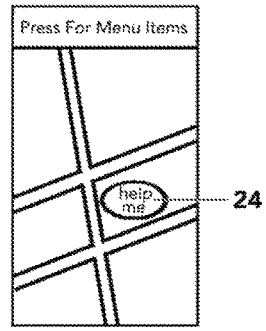
FIG. 3 is an exemplary representation of the mobile rescue website of the present invention after a user has triggered a test panic of FIG. 1.
Figure 4:
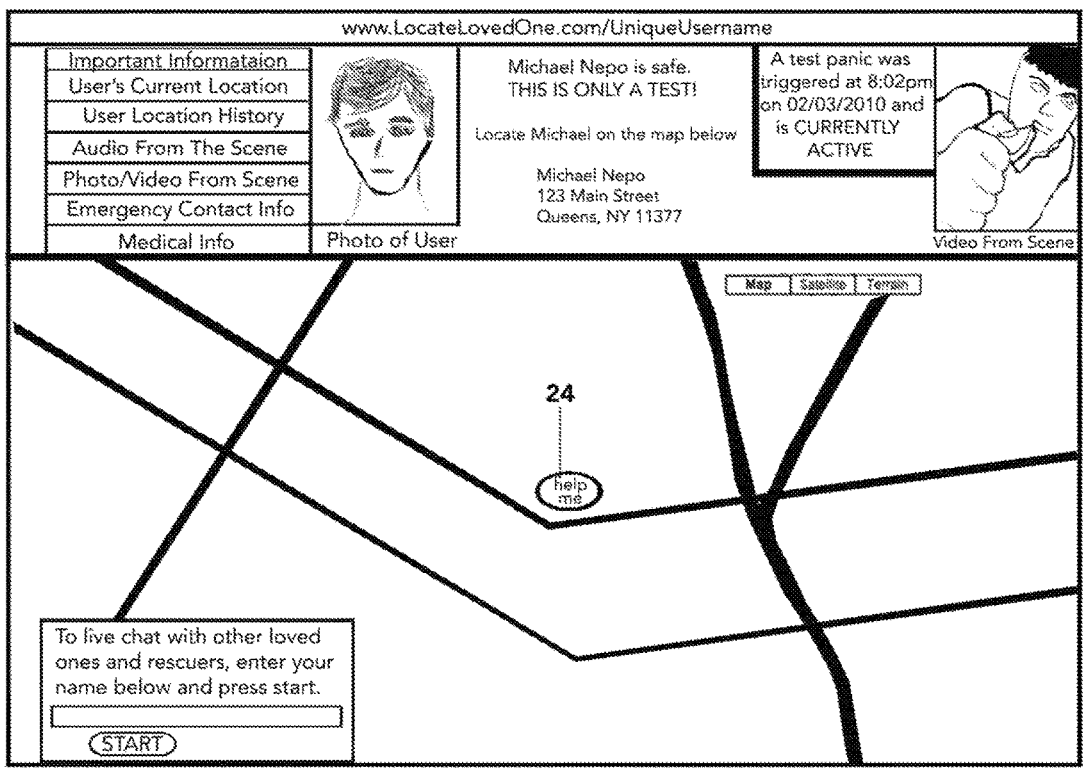
FIG. 4 is an exemplary representation of the desktop rescue website after the user has triggered a test panic of FIG. 1.

In certain embodiments, the user's location may only be shown on the website during active panics, unless the user actively selects an option to share location during non-panics. If the SMS recipient clicks on the web link during the active test panic, the recipient may be taken to the user's personal mobile rescue website, and once the webpage opens, the recipient may view the user's current location, which may be displayed in the form of a blue icon which sits on the map, which may include a message, such as "HELP ME". The HELP ME icon 24 illustrated in FIG. 3 may represent the present location of the user during a test panic on mobile smart phones. The HELP ME icon 24 illustrated in FIG. 4. may represent a larger test panic display for desktop, laptop and tablet devices. In certain embodiments, the user may cancel the active panic and the HELP ME icon may disappear from the website map, hence the website viewer may no longer view the user's current location after the user cancels a panic. However, in certain embodiments, emergency contacts may still be able to view the user's past locations, recorded video, audio, among several other data gathered during the active panic.

An example of the test panic email may include the following:
Subject—"test panic from [USER'S NAME]
Hi [EMERGENCY CONTACT'S NAME],
This email is a test panic message from a rescue service I use called Ultimate Life Protector. If this were a real emergency, I would need for you to immediately call 911 and tell them to locate and rescue me at the following website. You can click on it now to see where I'm located, to hear audio from my position, and to generally learn what the website can offer in case of a real emergency.
http://www.LocateLovedOne.com/[UNIQUE USER NAME]
In a real emergency, I need for you to click on the link above, and then call the phone number you see at the top of the website. Tell those rescuers (who will be nearest to me) to simply visit the web address above, and they'll be able to rescue me. In a real emergency, when you call me to confirm, you can ask me for my password. It is [INSERT PASSWORD] If I don't tell you the correct password, it means that I am under duress.
Thank you for agreeing to help me if I'm in danger!
[User's full name]
[User's phone number]
[User's email address]

In certain embodiments, when the user first installs and signs up for the present invention, the default mode for the rescue center may be disarmed. In such embodiments, the user may actively arm the present invention by pressing the "arm" button within the application. A pop up screen may appear which may convey that the present invention may be armed, such as, "Warning! When rescue center is armed, the authorities will be notified when a panic is triggered, so arm rescue center with caution. Once armed, the rescue center will remain armed until you disarm it. Users are strongly encouraged to leave the system disarmed and in test mode for a long period of time at first, so you can experiment with and learn all about how the system works without contacting the authorities." When the rescue center is armed, the application may display a message such as, "rescue center is currently ARMED" which may appear at the top of the application screen. If the rescue center is disarmed, the application may display a message such as, "rescue center is currently DISARMED" which may appear at the top of the application screen.

In certain embodiments, after reading the warning pop up message, the selectable options may include arm rescue center or cancel. If the user chooses to arm the rescue center, the user may be prompted to enter their correct password. After the correct password is entered, the ULP rescue center may be armed. In certain embodiments, the program may remain armed every time the user uses the present invention, until the user actively disarms it. Even when the user quits the application of the present invention and turns off the phone, when the phone is powered on, and a panic is triggered, the previous armed or disarmed setting may remain in effect until the user changes the setting.

In certain embodiments, the user may select either an advance warning of an anticipated imminent emergency, or an advance warning of an anticipated non-emergency advance warning message button which may be available within the application, and these messages may also be sent after the user clicks any applicable wireless panic button the designated number of times. When the user selects this option, messages may be sent to designated contacts which may notify them that the user may be planning to trigger a non-emergency panic such as a bad date alert, a test silent panic, or other alerts which may be meant to signify that the user perceives themselves to not be in physical danger, but they may choose to alert designated contacts that they may be in an uncomfortable situation. The non-emergency message may be sent via SMS, email and any other available messaging systems.

If the user triggers a bad date panic, emergency contacts may receive SMS and email messages which may state that the panic is not life threatening, but the user does request their assistance. If users plan ahead of time to possibly trigger a non-emergency or bad date alert, before triggering a panic, users may be encouraged to notify the emergency contacts that the user is not facing a real crisis via a pop up screen which appears after the user presses the non-emergency message button on the smart phone screen, or after the user presses any applicable physical panic button a designated number of times, the pop up screen may read, "If you intend to trigger a panic during a non-emergency, you are strongly encouraged to send advance warning messages to all contacts." The two button options which may appear underneath the pop up screen may read, "send warning" and "cancel". If the user selects "cancel", a new pop up screen appears which may read, "Non-Emergency Mode cancelled. Future panics will be treated as real emergencies." If the user selects, "send warning", SMS and email messages may be sent to all emergency contacts, which may state that the user is currently safe, but they intend to trigger a non-emergency panic. The contact's help might be requested by the user, but not for a life-threatening emergency.

In certain embodiments, non-emergency or bad date mode may be used to give adults the ability to constantly monitor their young children in a variety of intuitive and useful ways in non-life threatening situations, e.g., walking with young children at an outdoor festival. For example, the parent may enable location sharing during non-panics on the children's ULP devices before entering an outdoor festival, shopping mall, or any number of other places where the guardian may be concerned that they might lose sight of the children. With location sharing during non-panics active, the parents and children may walk around a large space confidently, because if they suddenly lose sight of their children, they simply awaken their smart phones, and instantly see exactly where the child or children are located on a map, in addition to various other vital data. Such embodiments, may be used with children or individuals suffering from mental illnesses such as dementia or other mental issues which call for their constant monitoring. However, in most embodiments of the present invention, it may be the user who controls whether or not their location and audio/video are being monitored. It may be the case that all users with knowledge of the password may cancel monitoring during non-emergencies.

In certain embodiments, the non-emergency or bad date mode may be used with teen age children during non-life-threatening situations such as an unchaperoned teen age party, for instance. With bad date mode, the user may press their panic trigger button the designated number of times if the user wishes to inform other friends who are present at the party that they are uncomfortable with a situation, perhaps involving an intoxicated, aggressive male classmate. The user may retain the power to determine whether or not they trigger a real panic or a non-emergency/bad date alert at any time, and whether or not this message is sent to rescue authorities or instead to only notify specified personal contacts, as in cases such as a party where the user may perceive the situation to be uncomfortable but not physically threatening. Since the message recipients may be at the very same party or event, the friends may instantly rescue the user who may be in another room. If the user chooses, she may include her parents on the list of panic recipients. If a panic has been triggered, the parents may be able to listen to the audio and/or view video from the situation and determine their next course of action.

In certain embodiments, the user may wish to notify their predetermined contacts that they are uncomfortable in a situation such as a bad date with a new acquaintance. Users may be advised to send a non-emergency message warning to their designated personal contacts before triggering a bad date alert, in order to notify contacts that a bad date alert may be coming soon.

In certain embodiments, before a potentially romantic date, the user may choose from among preference options including having the user's phone ring loudly after the user clicks the wireless panic button the designated number of times in order to trigger a bad date alert. Such ringing may be intended to help the user to interrupt the awkwardness commonly associated with bad dates, including as a method to interrupt a man as he attempts an unwanted kiss. In such a case, as soon as the user observes the man moving in to initiate an unwanted kiss, the ringing phone may help the user to pull away from the kisser in order to answer the phone. In such a case, the user may pretend to answer the ringing phone, and then they may pretend that something serious has come up which requires the user to politely end the date in order to address the problem. If the user chooses, when triggering a panic in bad date mode, designated contacts who may potentially be different from the standard emergency contacts may receive the bad date alert, notifying only this specified group of contacts that the user may be uncomfortable with their situation, but they may not currently perceive themselves to be in physical danger. Bad date mode may be intended to be an option for users who desire an option to alert loved ones to any concern they may have which may be problematic enough to warrant notifying loved ones of their discomfort with a particular situation, while the user may perceive the situation to be not dangerous enough to warrant notifying professional rescuers. Bad date mode may act as a middle option between user inaction and the user contacting the authorities.

In certain embodiments, one user might attend a social gathering along with two friends. The user might wish to be rescued from the awkward conversation they may be engaged in, or in another case, a public figure may trigger a bad date alert in order to discreetly notify her publicist that she wants to stop giving an interview. In this case, the user may want the publicist to rescue her from the interview. Therefore, after the user enters bad date mode, and if the user so desires, after she notifies her emergency contacts that she may be planning to use ULP in a nonthreatening situation by using the non-dangerous message feature described above, the user may press the discreet panic trigger button in order to be rescued from any socially delicate situation which isn't perceived by the user to present a physical danger.

In certain embodiments, the bad date mode may be used for bad dates in which the user may be uncomfortable with a situation, but may also believe themselves to be in no physical danger. Users might wish to have their close friends available, prepared to receive the ULP SMS if the user becomes uncomfortable with their situation, even if they don't necessarily initially perceive the situation to be physically dangerous. The friend may receive the message, and after clicking on the rescue link, the friend may immediately hear audio, live video, and the user's location, among other data provided. The message recipient may both call the user, and go to the user's location. In such a situation, where the user might initially have believed that there was no physical danger, but the panic message recipient listens to the ULP audio stream, and/or views the user's video stream, and subsequently believes that the user might be in actual physical danger, the message recipient may call the nearest professional rescue precinct shown on the rescue website, and tell the rescuers the user's unique web link. The nearby public rescuers may use the link to locate and rescue the user, while gathering all the timely data described herein. In other words, even if the user disarmed the rescue center, and even if a user triggered a non-emergency panic or bad date alert, if the designated contacts listen to the user's audio, and view the user's video and other information, and the contacts have reason to believe that the user may be facing a dangerous crisis, they may instantly contact professional rescuers nearest to the user's location, and by providing public rescuers with the user's web link, the rescuers may treat the emergency as if the user intended for the rescue center to be armed, and for the alert to be more serious than the non-emergency or bad date alert. FIG. 5 illustrates the home screen of the present invention's application. At the top of the screen, it may display whether or not the rescue center is armed or disarmed 26. In this example, it reads, "Rescue Center is currently ARMED" 26. Directly underneath the arming status, the silent panic button 28 may be displayed. When the user selects the silent panic button 28, a silent panic mode may be triggered. The present invention may further include a loud panic button 30, a medical panic button 32, and a safe journey button 34 displayed on the application home screen.

In certain embodiments, there may be a call 911 button 36. When the user presses this button, the user may have instant access to the outgoing phone call screen of the user's phone with 911 pre-dialed. In certain embodiments, 911 may be dialed with two taps of the screen. The first tap may be to select the call 911 button 36, and the second tap may to select the call button on the standard phone outgoing call screen. The user may arm or disarm the present invention by selecting the arm or disarm button 38. In certain embodiments, the user may select the more menu button 40 to view various available options as described below.

In certain embodiments, there may be multiple panic modes within the application of the present invention. As mentioned above, there may be a silent panic, a loud panic, and a medical panic. FIG. 6 illustrates the silent panic active screen 42, which may be accessed by selecting the silent panic button 28 on the application home screen. The status and type of the panic may be displayed in the upper half of the application screen. The user may cancel the active panic by selecting the cancel panic button 44. The silent panic active screen 42 may further include a sound alarm button 46, a call 911 button 36, and a false alarm button 48. In certain embodiments, prior to canceling any "real" panic, i.e. non-test panic, the user may have to enter their correct password for safety precautions.

The loud panic active screen 42 is illustrated in FIG. 7. The button options may be similar to the silent panic active screen 42, however the alarm may sound automatically when the loud panic button 30 is triggered. In certain embodiments, the loud panic active screen 42 may further include a mute alarm button 50. When the user selects the mute alarm button 50, the alarm may be silenced.

FIG. 8 illustrates the medical panic active screen 42. This screen 42 may include the same button options as the silent panic active screen 42 from FIG. 6. However, the color, text and graphics on the medical panic screen 42 may be different from the silent panic screen, which may be different from the silent panic screen 42 to easily distinguish them from each other. Further, the panic status may read medical panic active 42.

In certain embodiments, when the panic modes are activated, the user's location may be pinpointed and the map position may be sent immediately to the server/website. SMS and email messages may be sent to the user's emergency contacts, which may include campus security if applicable, as illustrated in FIG. 13, and the designated ULP rescue center as illustrated in FIG. 14, if the application of the present invention is in the armed mode. If the user has no cell phone signal when triggering the panic, repeated automatic attempts to send the panic messages and other data may be made until adequate cell tower or WIFI signal becomes available. Within the SMS and email, a clickable web link may be displayed with the user's own unique web address configured, using the user's unique username within the URL. Rescuers may click the link on their smart phones to view the mobile website as well as a desktop website such as for rescue dispatchers. In certain embodiments, the URL format may be simple and easily shared verbally on the phone with professional rescuers. In certain embodiments, audio and video may begin to stream from the user, directly to the server/website for rescuers to hear and see in near real time. A photo may be taken at the moment the panic is triggered and may be uploaded to the server/website.

In certain embodiments, on the application panic screens, buttons are available which read, "take new photo", "stop video" and/or "start video". When pressed, new photos and/or video may be taken, and then sent to the website, and in the case of "Stop Video" the video stops recording and transmitting. While a loud panic is active, as the user repeatedly selects the take new photo option, the bright camera flash may repeatedly shine, and the simulated sound of an analog camera may be repeatedly heard from the speaker of the mobile device in order to further prove to a potential attacker that their photos have been sent to the authorities. In addition to these buttons, photos and/or video may be automatically captured and transmitted during typical use after a panic has been triggered, because the default setting may be such that video and/or photo are automatically captured and transmitted during any panic, without requiring that these screen buttons are selected. The user may have the option to disable the default video recording during panics in the application preferences, for instance, if the user's location is such that their phone signal is expected to be too weak to successfully carry the data-heavy video transmission. In such cases, the user may select the "Low Resolution Video" option within the application preferences, so that the default setting mandates that video may be recorded during all panics, with highly compressed, lower resolution, to minimize the amount of data that must be transmitted during a panic, in order to maximize the successful transmission of the user's panic messages, location and audio. The user may also choose to select the automatically adjusting video resolution option within the application settings. With this feature selected, the video may be set to always record and transmit during a panic, and the resolution of the video may be automatically determined by the user's available bandwidth and cell phone signal, with the video transmitting automatically at a lower resolution when the limited available bandwidth requires a smaller data size to be transmitted. The default setting may be such that, during an active panic, if the cell phone signal becomes significantly reduced, the first data to automatically cease transmission may be video. In such cases, video may continue to record on the user's phone if local memory is available, where it may be stored until stronger bandwidth allows for the video transmission to the rescue clearinghouse to take place. If the available bandwidth has been reduced to such an extent where the audio recording may be transmitting too much data, as with the video, the audio may automatically continue to record locally on the user's smart phone, to be transmitted to the website when enough bandwidth becomes available to the mobile device. In other words, when available bandwidth becomes limited, video may be the first data to be restricted, and after video, audio may the second data stream to be restricted. Therefore, the present invention may prioritize the sending of the panic messages and the ascertainment and transmission of the user's current and previous location, above all other data-heavy functions. In such a low-bandwidth situation where video and audio are restricted, a still photograph may be taken and transmitted to the website. In such a limited bandwidth circumstance, the data may be recorded locally and may transmit when new bandwidth may become available.

In certain embodiments, the present invention may include accessories that may be utilized. For example, the user may have a designated ear or head mounted video accessory 54, in which live video from the user's vantage point may stream to the website for rescuers to view. In certain embodiments, the user may have a pulse monitor accessory such as the ring panic device, and in such cases the user's pulse rate may be displayed on the website. In such embodiments, a dangerously abnormal pulse reading may automatically trigger a Medical panic. In certain embodiments, the user may have a breathing monitor, and thereby the status of the user's breathing may be shown on the website. In such embodiments, dangerous breathing levels may automatically trigger a medical panic. In certain embodiments, a user may have a brainwave monitor, such as a flexible cap which may be densely packed with electrodes. In such embodiments, potential brain related issues such as a seizure, stroke, blunt impact, or other such issues are displayed on the website. Serious brain related issues detected by the brainwave monitor may automatically trigger a medical panic. In certain embodiments, the present invention may further include automatically activated electrical cardiac resuscitation pads. In such embodiments, when the user experiences sudden cardiac arrest, the sensors recognize this, and the pads administer the correct amount of electrical impulse to defibrillate the user's heart. A medical panic may be triggered. The process may automatically cease as soon as the sensors determine that a safe heart rate has been restored. The user's heart may be monitored on the main home screen of the rescue website automatically, as soon as the irregular heart-related issue is discovered by the heart sensor/pads.

In certain embodiments, the present invention may further include a transdermal medicine distribution patch, illustrated in FIGS. 36 and 37. When a user (in consultation with her doctor) determines that essential medicine should be administered at particular times each day, the medicine may automatically administer according to a predetermined schedule. Medicine may also be withheld until designated nano-blood probes determine that the user is facing a potentially deadly crisis such as a bee sting for users who are allergic to bee stings. In a case such as an allergic user suffering a bee sting, the medicine distribution patch may release epinephrine automatically after the probes determine that it may be medically necessary. A medical panic may be triggered when the probes determine that this crisis has begun.

In certain embodiments, the present invention may further include a decoy phone. In cases where an attacker insists upon the confiscation of the user's phone in order to prevent the user from summoning help, the user may provide the attacker with a decoy phone, separate from the active smart phone which may contain the rescue application described herein, and which may be hidden on the user's person. This deception with the decoy phone may enable the user to continue transmitting data to rescuers discreetly via the hidden smart phone, while deceiving the attacker into falsely believing that the user's phone has been confiscated and rendered inoperable during the crisis.

In certain embodiments, the silent panic mode, the loud panic mode and the medical panic mode may include the following differences: When triggering the silent panic mode, no camera flash may appear, and the phone may remain silent unless the user selects the sound the alarm button 46 on the application screen. If the user selects the sound the alarm button 46, a pop up message may appear to warn the user such as, "Are you sure? It will be loud." The user may select cancel and no alarm may be sounded. If the user confirms the sound alarm, the alarm may be sounded. The user may silence the alarm by selecting mute alarm button 50 on the application screen. Further, when triggering silent panic mode, the user's phone ringer may automatically switch to vibrate mode during the panic, and may automatically switch to loud ringer mode when the panic is canceled. When triggering the loud panic, the camera may flash brightly, and a loud noise may play such as a police siren, from the phone's speaker. A voice may also repeatedly play declaring, "Your pictures have been sent to the authorities." The user may silence the alarm by selecting the mute alarm button 50 on the application screen.

In certain embodiments, the default mode when triggering a silent panic may be for the ULP application screen to be automatically pushed to the background during silent panics. The default silent panic mode additionally may display a small notification icon visibly on the top of the user's phone screen, which may have been automatically switched away from the ULP screen to the main home screen of the user's phone when the panic was triggered. If an attacker were to take possession of the phone, they may see the user's standard phone home screen, and as a result of the visible home screen, the attacker may not realize that ULP is actively running in the background. The user may access the running ULP application and view any current activity by selecting the notification icon which may be viewable and selectable from the main home screen of the user's phone. If users so choose in the preferences, they may determine that the default notification symbol should not appear during active panics. If users choose to not display a notification symbol during active panics, users may access and view all ULP activity by selecting the application icon on the application screen of the phone. Some users may choose to disable the appearance of the notification symbol in order to prevent a potential attacker from noticing the notification symbol while a panic is active.

In certain embodiments, when default notification mode is active, a small notification symbol may appear and remain visible on the user's screen for as long as any active feature of the application may be running in the background, which may include features such as an active panic, the ULP application running in the background, active sharing of data during non-emergencies, among other running features. The user may view other services and applications on their phone, apart from ULP, such as the phone dialing feature, while ULP runs in the background. If the user wishes to view the active ULP features while a different non-ULP screen is being displayed, they may select the above notification symbol in order to return to the ULP application screens. It may be possible for users to disable the appearance of notification icons during active panics and when the application runs in the background, but there may be no offered way to eliminate the notification symbol during the sharing of data during non-panics.

When triggering the medical panic, in certain embodiments, no camera may flash and no noise may be made unless the user selects the sound alarm button 46. If the user selects the sound alarm button 46, audio from the phone's speaker may play such as a loud voice repeatedly declaring something such as, "Help me! I'm having a medical emergency!"

In certain embodiments, the silent panic may be triggered manually. Silent panic may be the default panic mode. In certain embodiments, the silent panic may be triggered when the user presses a physical Bluetooth® or other wireless-enabled panic trigger button 52 the designated number of times more than once, as shown in FIG. 9, may be triggered if the user presses the panic button on the ear/head-mounted video camera 54 the designated number of times more than once, as represented in FIG. 11, may be triggered if the user presses a panic trigger button contained on a ring which may be worn on the user's middle finger, may be triggered if the user presses any other designated physical panic trigger button, may be triggered if the user selects the silent panic button 28 from within the ULP application as illustrated in FIG. 10, may be triggered automatically during an active safe journey monitor if the user stops moving towards their designated destination as illustrated in FIG. 30, FIG. 40, FIG. 41, and FIG. 42, and may be triggered automatically if the accelerometer, g force monitor, pulse monitor, and other described health monitors detect emergency conditions.

Figure 43:
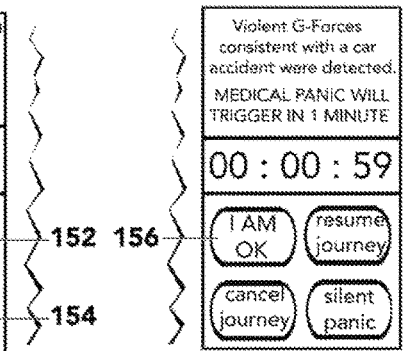
FIG. 43 is an exemplary representation of the user's smart phone vibrating to warn them of the imminent panic triggering as a result of the smart phone detecting strong g-forces and rapid deceleration consistent with dangerous situations, such as a car accident.

In certain embodiments, the silent panic may be automatically triggered when extreme g-forces and extremely rapid deceleration are detected which may be consistent with a car accident or other potentially injurious event as illustrated in FIG. 43, or may be triggered as a scheduled panic via the safe journey timer described below and illustrated in FIGS. 15 through 21. The user's phone may make no sound when triggering silent panic, and no camera flash may be seen. When triggering silent panic, the user's phone ringer may automatically switch to vibrate mode in order to prevent unwanted attention directed at the user if the panic message recipients attempt to call or send SMS to the user. If the user chooses, they may select the sound alarm button 46 from the active panic screen as illustrated in FIG. 6, if the user wishes to deter an attacker with sound of a police siren that may be coupled with a voice declaring, "Your pictures have been sent to the authorities." When the user first selects the sound alarm button 46, a pop up screen may warn the user that it will be loud. If the user confirms, the alarm may sound. This pop up warning may appear in order to prevent the user from accidentally sounding the alarm, for instance, if the user may be hiding from an attacker. The user pay mute the alarm by selecting the mute alarm button 50. The same button may toggle between the sound alarm button 46 and the mute alarm button 50, presenting the alternate option of the currently active mode.

In certain embodiments, when the user triggers a loud panic 30, either by selecting it from the ULP application as shown in FIG. 5 or by choosing for loud panic to be the default panic mode in the general preferences, in certain embodiments when one of the physical panic trigger devices may be pressed the designated number of times more than once, all the sequential actions described above may take place. In addition to those above actions which may take place when triggering a silent panic, when triggering a loud panic, the phone's camera flash may shine brightly, the audio sound which simulates the taking of a photograph with a traditional physical camera may be played through the phone's sound speaker, and a recording of an authentic American police siren may play through the phone's sound speaker, along with a loud voice which repeatedly may declare, "Your pictures have been sent to the authorities". This may be meant to deter a potential date rapist, or other possible assailant whom the user believes might be deterred by this camera flash and recorded warning. In such situations, the user may be advised to tell the attacker that his picture has been sent to the authorities, so he should not proceed with his illegal behavior if he wishes to avoid punishment.

In certain embodiments, the user may have the option to select either a take new picture button or a take new video option. During an active loud panic, when the user selects the take new picture button, the camera may shine brightly each time the button is pressed, to thereby inform potential attackers that the user likely has at least one clear picture of the assailant which has already been sent to the authorities.

Figure 57:
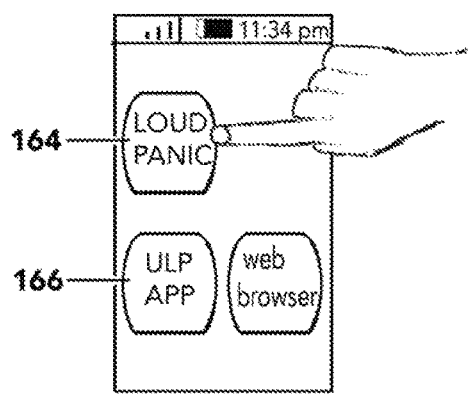
FIG. 57 is an exemplary representation of a user selecting the instantly launched and activated loud panic from the smart phone screen.

In certain embodiments, the user may choose to trigger a loud panic by pressing the wireless panic trigger button such as the panic ring button, the designated number of times more than once. The user may have the option, within the smart phone application, to place a loud panic button icon 164 directly onto the home screen of the user's smart phone, as shown in FIG. 57. This onscreen loud panic icon 164 may be distinct and separate from the onscreen icon which may be selected by the user to launch the main ULP application. This loud panic icon 164 may visibly be easily recognized by the user as the loud panic, visually different from the ULP application icon.

Figure 58:
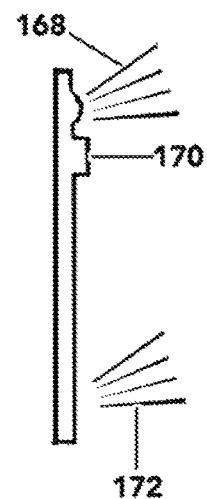
FIG. 58 is an exemplary representation of the loud panic from FIG. 57, showing a camera flash and a loud audio alarm.
Figure 59:
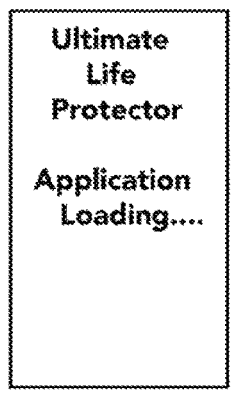
FIG. 59 is an exemplary representation of the complete software application launching after the instant loud panic from FIG. 57 is triggered.
Figure 60:
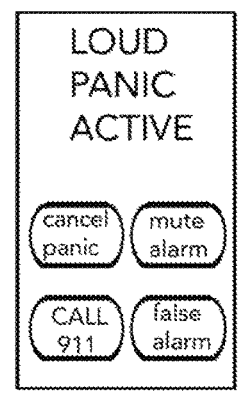
FIG. 60 is an exemplary representation of the active loud panic screen.
Figure 61:
FIG. 61 is an exemplary representation of the user's designated emergency contacts receiving a signal activated by the loud panic of FIG. 60.
Figure 62:
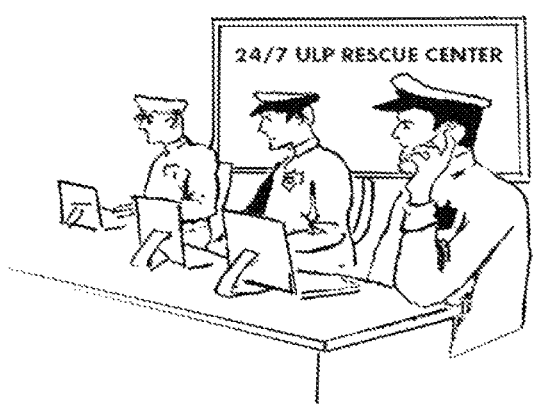
FIG. 62 is an exemplary representation of a designated Rescue Center receiving a signal activated by the loud panic of FIG. 60.

When the user selects this loud panic button icon 164 which may reside on the home screen of the user's smart phone, the smart phone may immediately display a bright camera flash 168 as shown in the side view of the phone in FIG. 58, a sound 172 which simulates the sound of a physical camera taking a picture from the phone's speaker as shown with simulated audio lines, a loud and authentic recording of an American police siren which may be repeatedly played, and a loud voice may repeatedly declare a statement such as, "Your pictures have been sent to the authorities. After the previous actions take place, the main ULP application may be fully launched as shown in FIG. 59, and any audio, photos, video, location data or other data captured by the user's phone at the instant when the user selected the onscreen loud panic icon 164 may be transmitted to the rescue website, and all previously described functions which take place during an active loud panic may be executed.

With the onscreen loud panic icon 164 present on the home screen of the user's smart phone, and also with the ability to press the wireless panic button the designated number of times more than once, users may be able to rapidly deploy the loud panic as an instantly available deterrent against a potential attacker, without any requirement for the user to launch the main application first. In such a case where a user believes that an attack may be imminent, the user may trigger the onscreen loud panic or may alternatively trigger a loud panic by pressing the wireless panic button the designated number of times more than once in order to deter a potential attacker more quickly than if the user were to be required to launch the main application first. In such a case, it may be essential for the user to display the bright camera flash and other functions from loud panic immediately after triggering the loud panic, so the button press at least twice and the onscreen loud panic icon 164 may allow the user faster access to the loud panic trigger than if the user were to be required to launch the main application first, because it may take several seconds for the main application to launch, and then to trigger loud panic from within the main application.

The user may have the option, within the smart phone application, to designate specific spoken phrases which, when spoken aloud by the user, the speaking of these designated phrases may cause specific panic modes to be triggered. For instance, if the user were to designate the phrase "Please don't hurt me" as a trigger phrase, when the user speaks this phrase as illustrated in FIG. 47, via voice recognition software present within the application as illustrated in FIG. 49, and also if the microphones which may be present in the wireless panic trigger devices detect the designated phrase, a silent panic may automatically be triggered as illustrated in FIG. 50 which notifies and shares all data with emergency contacts as illustrated in FIG. 51 and the rescue center as illustrated in FIG. 52. When successfully triggering the panic, pulse vibrations may take place on the user's phone and on all connected accessories to the ULP system such as the Bluetooth® or other wirelessly connected panic trigger button(s), and/or the ear mounted audio/video camera, and other wirelessly connected devices. These vibrations may serve to notify the user that their designated spoken phrase has successfully triggered a silent panic discreetly, without notifying a potential attacker.

In certain embodiments, the present invention may contain multiple monitors capable of detecting a variety of circumstances. An accelerometer may be provided on the mobile device which may be used in order to detect the user exceeding a threshold rate of deceleration. It may be the case that an extremely rapid deceleration from a previous rate of speed may be due to a car crashing into a tree, for example. In such a case, the accelerometer may detect the threshold change in the rate of speed which may cause the mobile device and all panic trigger devices to vibrate for a designated time period such as one minute. Further, if the user allows the vibrations to continue for the designated period without intervening, a signal indicating a medical problem may be automatically transmitted to the rescue clearinghouse. As a different example, if the user's car collides with another car, but the user and the passengers in both cars are uninjured, the accelerometer may detect the threshold change in the rate of speed, and may begin vibrating as described above. If the user determines that no injuries were caused by the collision, as the mobile device vibrates, the user may either select pause journey on the mobile device, or alternatively the user may press the panic trigger button once in order to pause the countdown to the imminent panic, thereby preventing the detected rapid deceleration from transmitting a signal indicating a medical problem to the rescue clearinghouse.

In certain embodiments, in addition to an accelerometer, the mobile device and wireless panic trigger devices may also contain at least one of: a magnetometer, a gyroscope, a barometer, a thermometer, a GPS location monitor, an assisted GPS monitor, a terrestrial transmitter assisted location monitor, an ultrasonic location monitor, a Bluetooth® beacon monitor, a cell-tower and WIFI-assisted location monitor, a bio-sensor, a toxin detector, a radiation detector, a g-force monitor, a pedometer, a sleep monitor, a brainwave monitor, a heart pulse monitor, a breathing monitor, an activity monitor, nano-probe blood monitors, among other monitoring capabilities. At least one of the aforementioned monitors and other monitors may be provided in order to detect a variety of problems which, when detected, and after the designated period of warning time elapses, during which time the devices may vibrate in order to warn users of an imminent panic, the detection of the problem may cause the mobile device to automatically transmit a signal indicating the problem to the rescue clearinghouse.

Figure 22:
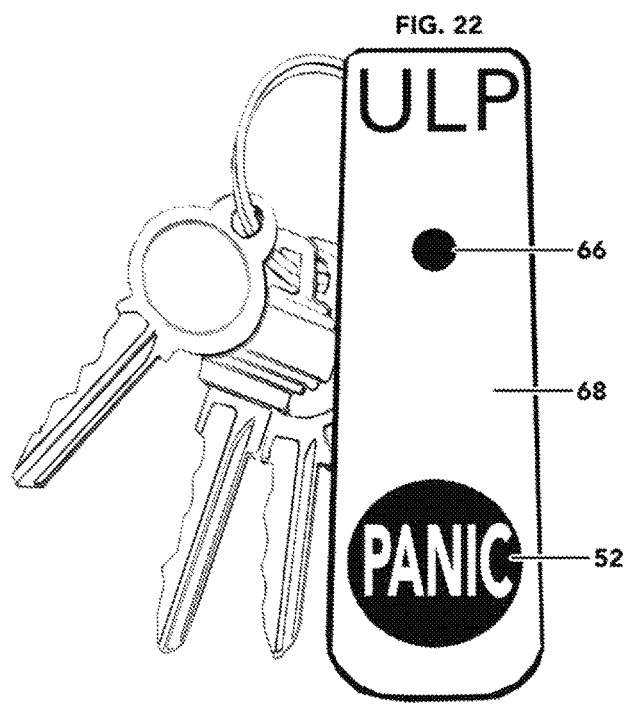
FIG. 22 is a front view of the panic trigger device of FIG. 9.

In certain embodiments, the user may trigger a medical panic in at least eight ways: Firstly, by selecting the medical panic button 32 in the application screen as illustrated in FIG. 5, second, by choosing for medical panic to be the default panic in the general preferences, in which case the medical panic made may be triggered when the user double clicks any of the physical panic trigger devices such as the thumb sized button 66 as illustrated in FIG. 22, thirdly, if a designated medical verbal phrase such as "I'm having chest pains" may be spoken, the phrase may be detected by the voice recognition within the smart phone via a microphone attached to the mobile device or via a wireless accessory which may contain a microphone and may connect wirelessly to the smart phone, fourthly, if general preferences are set to default to medical panic when the safe journey timer reaches zero, fifthly, if general preferences are set to default to medical panic when the safe journey monitor detects a problem, sixthly, when the g-force and accelerometer monitors detect a problem, medical panic may be triggered, seventh, when one of the medical monitors such as the pulse monitor or brainwave monitor detects a medical problem, and eighth, when the user presses a wireless panic trigger such as the panic ring button the designated number of times. For instance, the default panic mode to be triggered when double pressing the button may be silent panic, but if the user unexpectedly experiences a medical crisis, they may press the button a different designated number of times more than two, such as four clicks.

As with all panic modes, the sequential actions described for the silent panic mode may occur, and in addition to those sequential actions, the SMS and email messages, along with the rescue website, may notify the rescuers that this may be a medical emergency. If the user has certain preexisting medical conditions, rescuers may learn this key information on the website in the user's medical info section. If the user possesses the medical accessories listed above, the rescuers may do at least one of the following on the user's rescue website: monitor the user's pulse rate; monitor the user's breathing; monitor the user's key blood levels; monitor the user's brainwaves for possible seizures, stroke, blunt impact, or other electrode-detectable brain issues; determine the amount and timing of, and monitor the automatic administering of vital medicine; monitor the activity of the automatically activated electrical cardiac resuscitation pads, among other features. With medical panic, the user may not be required to speak for assistance to be summoned. For instance, if a user experiences an asthma attack which may make it impossible for them to speak, the user may either press the wireless panic trigger button the designated consecutive number of times to trigger an asthma attack medical panic, or the user may also press the medical panic button 32 and an ambulance may be set en route to rescue the user within seconds after pressing either button 32. There may be no need to speak or remain conscious once the panic has been triggered.

In certain embodiments, if the user has a serious recurring medical condition such as asthma or a heart condition, the user may be able to create multiple unique screen buttons of their choice, to reside on the screen of the mobile device. The user may also program a certain number of button clicks to trigger the newly customized panic mode such as "asthma attack panic" or any other distinct chronic condition the user may have such as "chest pains". The custom panic mode creation may be offered in the application. The user may either select the asthma option from the application screen or press the wireless panic trigger button the designated number of times to trigger the asthma attack panic, in order to inform rescuers of the specific nature of the crisis. In cases where the user may be unable to speak, the user may press the button the designated number of times at least twice or select the option from the application screen, instantly notifying rescuers of the nature of the emergency without requiring the user to speak. The user may create several different customized panic modes relating to multiple potential health crises which might be anticipatable by users with particular preexisting health conditions such as chest pains, feeling dizzy or numb, asthma attack, and the like. In certain embodiments, if the user selects the sound alarm option from the application 46 as illustrated in FIG. 8, a loud voice may repeatedly declare something such as: "Help me! I'm having a medical emergency!"

Figure 38:
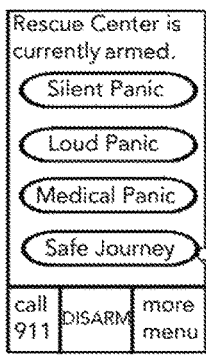
FIG. 38 is an exemplary representation of a user selecting the safe journey button of FIG. 5 and FIG. 15.
Figure 39:
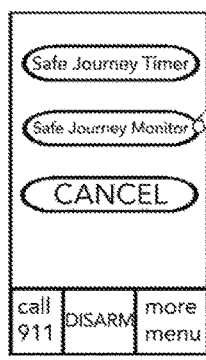
FIG. 39 is an exemplary representation of a user selecting the safe journey monitor button.
Figure 40:
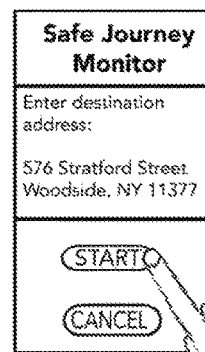
FIG. 40 is an exemplary representation of a user starting the safe journey monitor after entering their designated destination.
Figure 41:
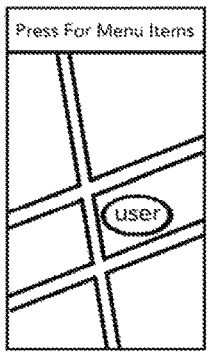
FIG. 41 is an exemplary representation of a user failing to continue traveling towards their designated destination.
Figure 42:
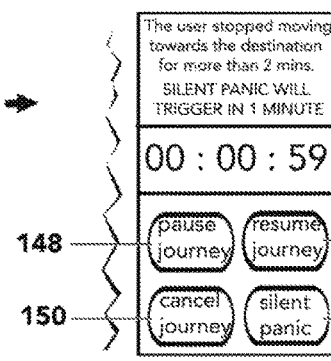
FIG. 42 is an exemplary representation of the user's smart phone vibrating to warn them of the imminent panic triggering as a result of FIG. 41.

Before the user embarks on any journey, the user may select the safe journey monitor from the application, as illustrated in FIG. 38 and FIG. 39, and enter the address, location on a map, and/or latitude/longitude coordinates, of their intended destination in the safe journey monitor within the application, as illustrated in FIG. 40. After the user activates the safe journey monitor, the user may begin to travel towards their destination. If the user either deviates away from routes which lead towards the intended destination, or if the user stops moving and stays in the same place for a designated period of time such as two minutes, as illustrated in FIG. 41, the user's smart phone, panic ring and any other wireless panic trigger devices may begin to pulse vibrate for a designated period of time such as one minute, as illustrated in FIG. 42. These vibrations may be meant as a warning to the user that the safe journey monitor will trigger a silent panic soon, because the user has either deviated away from and/or stopped progressing towards their designated destination. If the user is safe and has stopped moving towards their designated destination for a reason not associated with a crisis, for instance if the user may be stuck in gridlocked traffic, when the user notices the vibrating smart phone, panic ring or other vibrating panic trigger device, the user may pause the safe journey monitor until they are ready to proceed with the remainder of their journey, as shown in FIG. 42, example 148. The user may choose in the preferences to enable a single button press of the ring or other wireless trigger to select the pause journey option. This may enable a user who is safe but has stopped progressing towards the designated destination to press the button once to pause the journey after detecting the vibrating panic device, and press the button once again after at least one minute has elapsed since the previous button press paused the journey, to restart the journey. When the user is ready to continue with their journey, they may also be able to re-activate the safe journey monitor by selecting the resume journey button as shown in FIG. 42, example 152. If the user wishes to cancel the safe journey monitor, they may press a button labeled cancel journey 150. If the user wishes to trigger a silent panic, they may press the silent panic button 154, and they also may trigger a silent panic by pressing the button on the ring the designated number of times more than once. The speed of the user's movement during the journey may be tracked and presented on the website. After the user successfully arrives at their designated destination, the user may have the option of automatically messaging the emergency contacts to automatically notify the contacts that the user has safely arrived at their designated destination.

Figure 44:
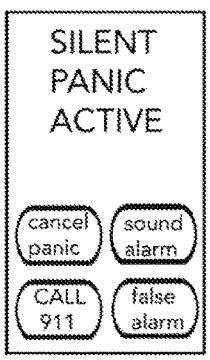
FIG. 44 is an exemplary representation of a silent panic triggering as a result of completed countdowns from FIG. 42 or FIG. 43.
Figure 45:
FIG. 45 is an exemplary representation of the user's designated emergency contacts receiving a signal activated by the silent panic of FIG. 44.
Figure 46:
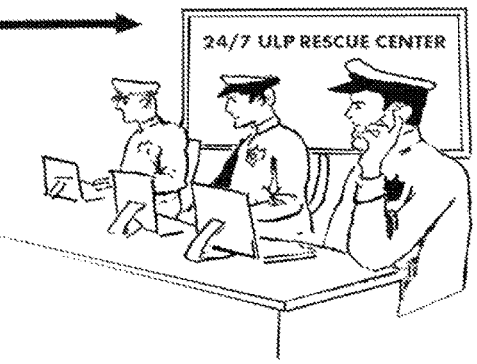
FIG. 46 is an exemplary representation of a designated Rescue Center receiving a signal activated by the silent panic of FIG. 45.

In cases where the user has stopped progressing towards their designated destination while the safe journey monitor is active, after the designated vibration period has expired, if the user does not intervene, silent panic may be automatically triggered, as illustrated in FIGS. 44 through 46. In cases such as car accidents, where the user may become unconscious or otherwise unable to access their phone, the silent panic automatically triggered by the safe journey monitor may inform all emergency contacts and rescuers that the user has failed to complete their journey, while providing the rescuers with the previously described data needed to understand details of the crisis in order to rescue the user.

Figure 15:
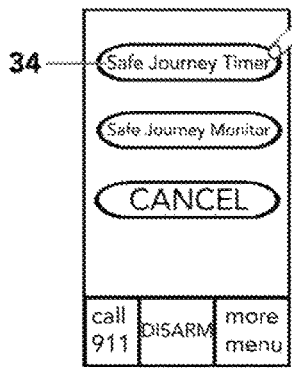
FIG. 15 is an exemplary representation of a user selecting the safe journey timer after the user selects the safe journey option from the application home screen of FIG. 5.
Figure 16:
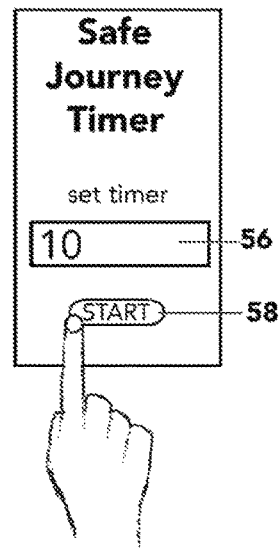
FIG. 16 is an exemplary representation of the application screen which appears after the user selects the safe journey timer option of FIG. 15.
Figure 17:
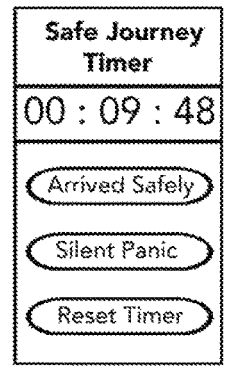
FIG. 17 is an exemplary representation of the application screen which appears after the user starts the safe journey timer of FIG. 16.
Figure 18:
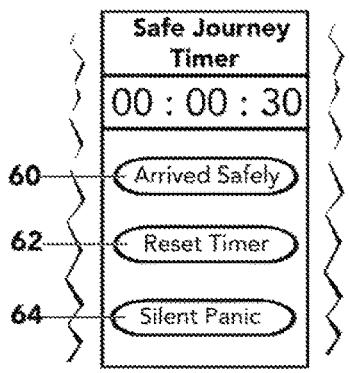
FIG. 18 is an exemplary representation of the safe journey timer countdown screen of FIG. 17 reaching a designated countdown time, at which time the user may be notified that the countdown is nearly complete.
Figure 19:
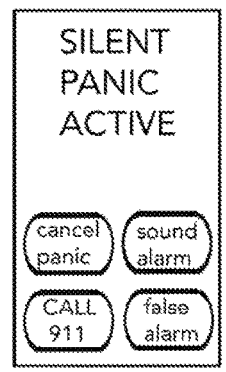
FIG. 19 is an exemplary representation of the silent panic screen which appears after the timer of FIG. 18 runs to zero.
Figure 20:
FIG. 20 is an exemplary representation of the user's designated emergency contacts receiving a signal activated by the timer of FIG. 18.
Figure 21:
FIG. 21 is an exemplary representation of a designated rescue center receiving a signal activated by the timer of FIG. 18.

In certain embodiments, the application of the present invention may further include a safe journey timer, which may set off an automatic panic trigger. The user may activate the safe journey timer mode by pressing the safe journey timer button 34 as illustrated in FIG. 15. The user may then set the timer for the amount of time they choose. If it normally takes 10 minutes for a student to walk home from the library, for instance, the user may set the timer 56 for ten minutes as illustrated in FIG. 16, select the start button 58 and then the user may put the phone back in their pocket while the timer counts down, as illustrated in FIG. 17. When the timer reaches the final 30 seconds of the countdown, the smart phone may begin to pulse vibrate for each of the remaining 30 seconds of the countdown as illustrated in FIG. 18. This may be done to warn the user that the countdown may be almost finished. If the user is safe, when the vibrations begin, the user may select the arrived safely button 60 to cancel the countdown, or the user may select the reset timer button 62, as illustrated in FIG. 18. If, during the countdown, the user is conscious and suddenly discovers that they are facing a crisis, they may instantly trigger a silent panic by pressing the button on the panic ring trigger device the designated number of times at least twice, or alternatively by pressing the button on the attachable key fob panic trigger device 52 as illustrated in FIG. 22. In certain embodiments, the users may press the panic button the designated number of times at least twice on the ear mounted video camera 54 as illustrated in FIG. 11 and the user may also trigger a panic by selecting the silent panic button 64 from the safe journey timer screen during the countdown, as illustrated in FIG. 18. If the user loses consciousness or is otherwise incapacitated, when the timer reaches zero, the silent panic mode may automatically trigger as illustrated in FIG. 19, and the rescuers may be alerted with SMS and email as illustrated in FIG. 20 and FIG. 21. As with other panic triggering, the sequential actions of the silent panic mode may be executed when the safe journey timer countdown reaches zero. Additional accessories may also contain physical panic buttons which the user can press the designated number of times at least twice to manually trigger a panic at any time, including during the safe journey timer countdown.

As illustrated in FIG. 43, in cases when the smart phone and wireless panic trigger devices detect a sudden and extreme variation of g-forces and rapid deceleration such as the g-forces and rate of deceleration consistent with a moving car crashing into a tree, for instance, the designated g-force threshold and the designated threshold for dangerous deceleration, when observed by the accelerometer and g-force detector in the phone and in the wireless panic trigger devices, may cause the phone and devices to vibrate for one minute. At the end of that minute, medical panic may be automatically triggered. If, during the minute of vibrations, the user selects the button labeled I am OK 156, as shown in FIG. 43, the safe journey monitor may be paused and no panic may be triggered. The user may also press the panic ring button once to pause the journey after feeling the vibrations. If the user takes no action after the phone and the panic trigger ring begin to vibrate, at the end of the minute, medical panic may be automatically triggered.

Figure 55:
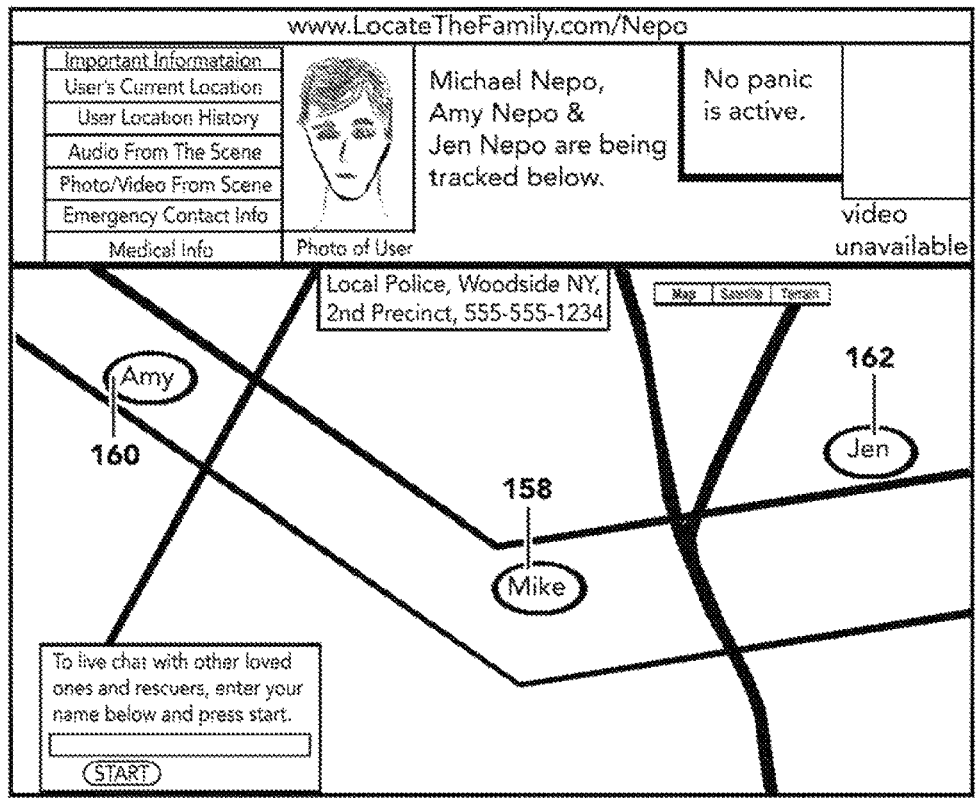
FIG. 55 is an exemplary representation of the rescue website displaying three members of one family, during a non-dangerous non-panic situation.

In cases where the user chooses to provide the emergency contacts with updates as to the user's location and speed of travel during the journey, regardless of whether or not the user has stopped progressing towards their designated destination, and regardless of whether or not a panic has been triggered, the user may be able to activate a function with which the user chooses to share their location data with the emergency contacts by transmitting the user's location data to the website at regular, designated intervals, without any active panic. In such cases where the user may have chosen to transmit their location data to the rescue website during their journey, users may notify emergency contacts such as parents that they may have the ability to monitor and observe the user's location data on the rescue website as the user travels towards their designated destination, even when no panic mode is active, as illustrated in FIG. 55, examples 158, 160 and 162. If the user chooses not to activate location data sharing during non-panics, it may not be possible for emergency contacts to view the user's location data unless the user triggers a panic, and/or if the user chooses to activate the location data sharing option during non-panics. If data sharing during non-panics is activated without the user's knowledge, the user may see a prominent notification symbol in order to inform the user that data sharing during non-panics is active. If the user selects the notification symbol, users with knowledge of the correct password may be able to deactivate all monitoring.

Figure 53:
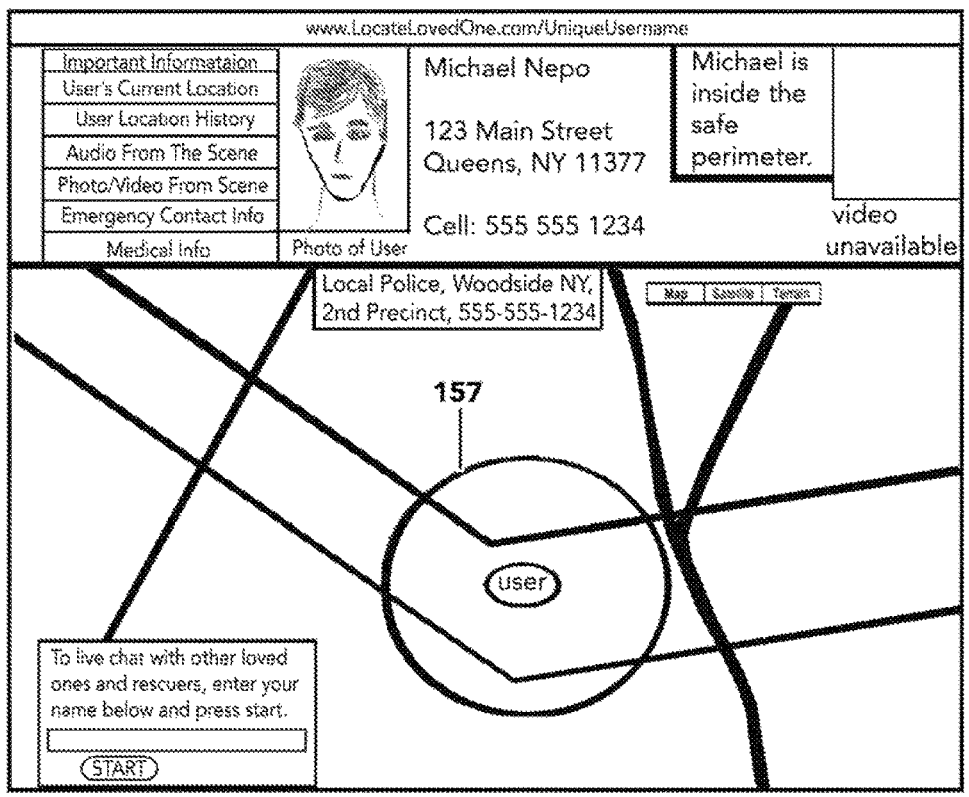
FIG. 53 is an exemplary representation of the rescue website displaying the user to be located within a safe perimeter.
Figure 54:
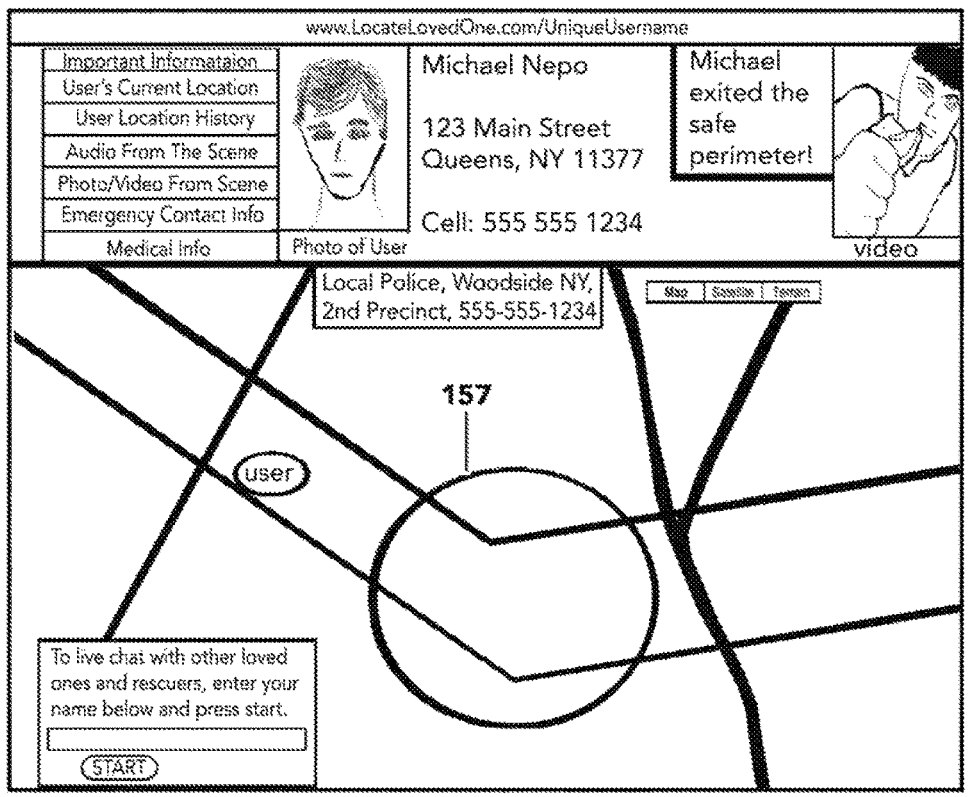
FIG. 54 is an exemplary representation of the rescue website displaying the user to be located outside the designated safe perimeter.

The user may have the option, within the application of the present invention, to designate a specified area considered to be a safe zone by the user and the user's emergency contacts. The user, along with loved ones such as parents, may have the ability to set and reset the size and shape of the borders of this safe zone, to form the perimeter of a designated safe area 157 as illustrated in FIG. 53. While the perimeter monitor is active, if the user remains within the designated safe perimeter as illustrated in FIG. 53, no panic may be triggered. If the user crosses the border of the perimeter, exiting the designated safe perimeter as illustrated in FIG. 54, a perimeter breach panic may be triggered, and the rescue website may display a large text statement which may inform the designated recipients that the user has exited the safe perimeter. Users may determine whether or not the perimeter breach should result in the contacting of the ULP rescue center. For instance, in most cases, a user simply exiting the safe perimeter does not suggest that the user is in mortal danger. For this reason, the default mode may be for the designated contacts to receive messages when the user breaches the safe perimeter. In other cases, such as a user with severe dementia, the settings may be selected so that the ULP rescue center as well as the designated contacts are notified of the perimeter breach.

In cases when a user is outside the safe perimeter, the user may designate the safe perimeter as the designated destination. When the user arrives at the designated destination, if the user chooses, they may select an option which enables all emergency contacts to automatically receive messages such as SMS and email notifying the emergency contacts when the user has arrived at their designated safe destination.

In certain embodiments of the present invention, a family mode may be incorporated. Multiple users of the present invention may have the ability to designate themselves as members of a single family unit. Each family member may possess their own unique username. If each user within the family has enabled the location data sharing during non-panics, all the participating users' location data may be transmitted to two distinct websites; a) The user's primary website with a unique URL such as www.locatelovedone.com/[USERMAME] as illustrated in FIG. 26, and b) www.locatethefamily.com/[shared family name] as illustrated in FIG. 56.

When the family initially enters their family name, if this name has already been entered into ULP by a different family, it may not be possible for the user to register this name. A unique family username may be required. For instance, Smith77 may be used instead of Smith.

Figure 56:
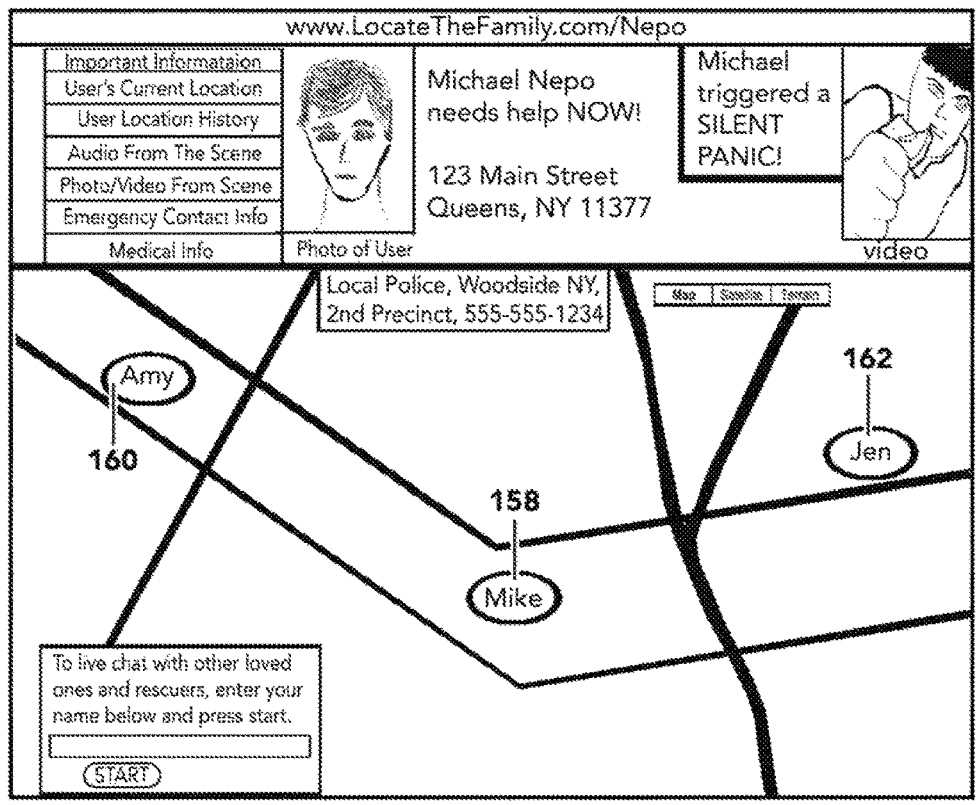
FIG. 56 is an exemplary representation of the rescue website after one family member triggered a silent panic.

If individual members of this family have activated the shared location data during non-panics, all family members may be able to navigate to their family's unique web URL such as www.locatethefamily.com/nepo as illustrated in FIG. 56. When any viewer attempts to view the locations of various individual members of a family, it may only be possible for the viewer to see the locations of family members who have willingly consented to the activation of shared location data during non-panics. When users choose to enable the shared location data during non-panics, a pop up screen may appear which informs them that their location and other data may be monitored with this feature activated. All users who possess the correct password may be able to activate and deactivate this data sharing feature.

If the user consents to share data during non-panics, a default notification symbol may remain visible on the user's smartphone at all times while the sharing of location data during non-emergencies remains active. If sharing becomes activated without the knowledge of the user, the user may notice the presence of the notification symbol and by selecting the symbol, the user may be brought to a screen on which they may clearly see that their location and other data are being shared. If the user wishes to change the current data sharing status, users may be required to enter their correct password. After entering the correct password, users may choose to deactivate data sharing during non-panics. Within the application preferences, users may choose for no notification symbols to appear during active panics, but there may be no offered way to eliminate the notification symbol during the sharing of data during non-panics.

For those users who have activated the data sharing during non-panics function, it may be possible for family members such as parents to view the locations of all participating family members on one website. Any viewer to this website may have the option to commence direct video and/or audio communications with any and all attendees on the website. For instance, a parent may have the ability to instantly communicate via video and/or audio with a sibling and also a friend of the user, with multiple attendees present on a video/audio conference call. In cases where young children or severe dementia patients may need constant monitoring, users may have the ability to choose to transmit audio, video, location data, and any other available data from the user's position, regardless of whether or not a panic has been triggered. This may require large amounts of bandwidth, therefore users may be aware that transmitting such data might exceed their allotted monthly bandwidth allowance.

More commonly, in other cases, it may be possible for users to choose to only transmit location data during non-panics, but not to transmit audio, video and other data during non-panics. This may be commonly used by families who wish to keep track of the users' locations in a minimally intrusive manner, without using excessive bandwidth required to transmit vantage point video and other data-heavy transmissions.

In other cases, such as severe dementia patients, it may be possible for users to transmit all available data, but this may require that the user actively select this option before it transmits the data.

In a case where one or more family members trigger panics, the rescuers may view location and all other vital data from multiple family members on the same family website as illustrated in FIG. 56.

In a case where one or more family members enable the safe journey monitor, viewers of the website such as parents may have the ability to monitor the progress of multiple family members as they progress towards their respective destinations, all on the same website.

In certain embodiments of the present invention, parents may monitor the journeys of their children and the users may preprogram for themselves a variety of consenting users' scheduled journeys and destinations including planned after-school destinations, and the like. For consenting users such as children, various locations which comprise the users' common travels may be stored and selectable as preset destinations. Parents may choose to be alerted if one or more children either arrive or don't arrive at specified locations at the designated time, and conversely parents may also choose to be alerted if one or more children either depart or don't depart from specified locations at the specified time. In addition to the commonly visited destinations, parents may select new planned journeys and locations for consenting users in order to monitor the user at any time within safe journey monitor. In all cases where the user knows the password, it may be possible for users to cease all journey monitoring and non-panic location monitoring after entering the correct password.

In certain embodiments of the present invention, a cycle mode may be incorporated. While the cycle mode is active, the mobile device and wireless panic trigger(s) may vibrate at scheduled times on designated days in order to remind the user that the designated contacts are seeking a confirmation that the user is not experiencing a problem. Elderly users who live alone may confirm that they are OK at regular designated intervals, thereby enabling potentially distant loved ones to monitor their elderly loved one from afar. If the user fails to either press the ring or other wireless button device the designated number of times at least once, or if the user fails to select the "I'M OK" button at the designated time after the device vibrates as a reminder for the user to confirm their wellbeing, the designated message recipients may do at least one of listen to audio from the user, observe the user's present and recent locations and monitor the user's pulse, among other information the message recipients may observe. After observing the available information on the non-responding user, the message recipients may determine the most appropriate course of action, including potentially notifying the rescue center, attempting to call the user, or traveling to the user's location to confirm their wellbeing in person.

In certain embodiments of the present invention, an institutional mode may be incorporated. Instead of four or five users within a particular family as may be commonly used with family mode, with institutional mode, hundreds or more individuals may be protected via a unified institutional structure such as that of universities, non-governmental aid organizations, corporate communities with campuses, among other large organizations which may require safety systems in place to monitor multiple crises from dozens or hundreds of users simultaneously, from a single clearinghouse website. Institutional mode enables hierarchical organizations to effectively cope with major crises such as a campus shooter, severe weather events or other crises which may put hundreds or thousands of institution-members in danger due to a specific problem. Single abductions or other crises threatening a single or small number of individuals may also be instantly detected with institutional mode, as well as crises which may endanger larger populations. The unified leadership of the institution may have access to medical, contact and other information relating to each participating member of the organization. Institutional leaders may communicate emergency messages with instructions on how members can protect themselves, which may be sent to hundreds or more members in the case of a campus shooter or other major crisis which may involve an entire institutional community.

In certain embodiments of the present invention, a buffer mode may be incorporated. While the buffer mode is active, the user's phone may constantly record at least one of location information, audio information, video information, health monitor information, and other information. The recorded information may be stored locally on the mobile device. The recording of location information, audio information and other information may take place during a safe period, and may continue for as long as the buffer mode remains active. When the recorded information accumulates for a designated period of time such as ten minutes, the device may automatically delete the information recorded at the earliest portion of the recording, while the device may continuously record new information in order to replace the earliest deleted information with the newly recorded information, thereby providing a continuously updated fixed amount of locally stored recorded information. When the user triggers a panic mode while the buffer mode is active, the latest fixed amount of locally stored recorded information may be transmitted to the rescue clearinghouse, to thereby enable the information recipients to hear audio information, see video information, see user location information and other recorded information from the designated fixed period leading up to the time when the panic mode may be triggered. The buffer mode may thereby enable the information recipients to learn useful details regarding the user's situation in the time leading up to a problem in addition to learning details regarding the user's situation after the panic mode may be triggered, providing the information recipients with a better understanding of the circumstances which led to the problem.

In certain embodiments, the present application may include menu selections. The following options and functions may reside the in the menu which may be reached by pressing the more menu button 12 within the application: quit ULP; I am OK/send false alarm message/non-dangerous emergency warning; conference call; panic message status; test panic; general preferences; 24/7 ULP rescue center; add/edit emergency contacts; edit personal info; add/edit profile picture; pair ULP with designated physical devices including panic triggers, medical monitoring devices, audio and video recorders, among other accessories; quick start instructions; complete instructions; about ULP; and the like.

The following may include the description of options which may be selected from within the application. If no panic is currently active and the user selects quit ULP from the application menu, or selects quit at the bottom of the application screen, the application may quit without requiring a password. If the user does not wish to quit the application, but instead wishes to cancel the active panic because they have safely emerged from a crisis, the user may select the cancel panic button 44 as illustrated in FIG. 6. The user may be prompted to enter their password. When the correct password is entered, a pop up notification may appear on the screen which may read the following: "The panic has been canceled and 'I AM SAFE!' messages have been sent. Contact rescuers to confirm your safe status." After the user confirms, the pop up message may disappear, the user's smart phone screen may automatically display the mobile internet browser, and the user may be automatically taken to their own rescue website where they may text and/or voice and/or video chat with rescuers and emergency contacts who were involved with the rescue. Finally, after the correct password has been entered in order to cancel an active panic, the user's phone ringer may automatically be turned to the highest volume. As explained previously, when a silent panic is triggered, the user's phone ringer automatically changes to vibrate mode for the duration of the silent panic. When canceling a panic after entering the correct password, the phone ringer volume may automatically increase to the maximum volume in anticipation of likely incoming phone calls from rescuers and emergency contacts who may likely wish to confirm the user's safe status, so the ringer volume increase may prepare the user to receive the communications. An example of the "I AM SAFE!" SMS message may be provided below:

"I AM SAFE! Situation is now stable but it was a crisis. U can call me to confirm. If u called 911, call them & say I'm safe."

An example of the "I AM SAFE!" email message is provided:
Subject line—"I AM SAFE!"
Email body—"[FULL NAME OF EMERGENCY CONTACT]!
I am safe! My situation is now stable but this was a crisis. Call me ASAP to discuss it, and to confirm my safe status. If you called 911, call them back and tell them I'm safe.
[USER'S FULL NAME]
[USER'S PHONE #]
[USER'S EMAIL]
Learn more about this safety/rescue service and sign up yourself at
http://www.UltimateLifeProtector.com."

If a panic is active, the panic may need to be canceled before the application can quit, and as explained above, a password may be required to cancel active panics. If the user attempts to quit the application during an active panic, they may be prompted to enter their password. If the correct password is entered, the same pop up notification as above may appear on the screen: "The panic has been canceled and 'I AM SAFE!' messages have been sent. Contact rescuers to confirm your safe status." After the user confirms, the pop up message may disappear, the ULP application may quit, and the user's smart phone screen may switch to the internet browser, where the user may be taken to their own rescue website where they can text and or voice and or video chat with rescuers and emergency contacts who were involved with the rescue. As further explained below, the user may also start an audio and or video conference call which can involve multiple rescuers.

In certain embodiments, if the user attempts to quit ULP during an active panic, or if the user only attempts to cancel the active panic, and they enter a designated false password, for instance "1313", a pop up message appears which reads, "False Alarm Messages Have Been Sent and the panic has been canceled." The screen may subsequently read, "ULP QUITTING . . . .", and finally the screen may switch over to the standard home screen of the smart phone. As the ULP application screens disappear from view, the panic processes may continue in the background. The user's location may continue to update at regular intervals, audio, photo, video and all medical data may continue to stream to the rescue website, and rescuers may continue with the rescue attempt. In certain embodiments, if the user wishes to deceive an attacker by falsely shutting off the power of the phone, the user may select the "power phone off" button from the application menu. If the user enters the designated false password, the phone may appear to shut down as normal, with the standard shut-down process shown on the screen. The user may show this false power shutdown to an attacker, to convince them that the phone power has been turned off. As detailed above with the false quit, while the phone appears to have been powered off, all data including the user's location, audio, video, medical data and the like, continue to transmit to the website. This power-off deception may be meant to convince an attacker that the mobile device has been turned off, when in reality, the mobile device may still be on and continuing to provide data to the website in order to continue to facilitate the rescue.

The designated false password relating to quitting ULP, canceling the panic modes or powering off the phone, may be used to deceive a potential attacker into falsely believing that the user has canceled the panic, powered off the phone, or in the case of panic message status, to deceive the attacker into believing that no panic messages were ever sent. However, if the user simply enters an incorrect password, they may be prevented from canceling the panic, prevented from quitting the application, and continually prompted to enter the correct password until they either stop attempting to access password-restricted features, or until the correct password is entered. Only after the user enters the designated false password may any of the above deception take place. As detailed above, the preferred method to deceive an attacker may be to hand them the dummy, or decoy phone, while keeping the true rescue phone safely hidden and quiet.

If the user suddenly discovers that they have accidentally triggered a panic while they are safe, the user may press the false alarm button 48 on the application screen. If the user enters the correct password, false alarm messages are sent to all contacts.

The false alarm SMS message may be composed of the following information and may be sent to all contacts and, if armed, to the rescue center: "FALSE ALARM! Disregard emergency message I sent. I'm not in danger. If u called 911, call them & say I'm safe. U can call me 2 confirm."

Concurrently, the false alarm email message may be sent to all contacts and the rescue center, and may read as follows:
"SUBJECT LINE—"PLEASE IGNORE THE PREVIOUS PANIC MESSAGE"
Email body—"FALSE ALARM! IGNORE EMERGENCY MESSAGE! Please disregard the emergency message you received from me. I am not in danger. If you called 911, call them back and tell them I'm safe. Feel free to call or text me to confirm.
[USER'S FULL NAME]
[USER'S CELLPHONE NUMBER]
Learn more about this safety/rescue service and sign up yourself at http://www.ultimatelifeprotector.com."

If the user did not accidentally trigger a panic, but the user simply wishes to inform their emergency contacts that they are safe, they may select the "I am OK" button which may be shown in the More Menu 2 area. When the user selects "I AM OK", they may be prompted to enter their password. If they enter the correct password, the following SMS may be sent to all contacts. "I AM OK. You can call if you wish to confirm." The following email may be sent to the same emergency contacts:
"Subject—I AM OK!" Email body, "[EMERGENCY CONTACT'S FULL NAME], I am OK! If you want to confirm it, you can call or text. Don't worry!
Love,
[USER'S FULL NAME]
[USER'S CELLPHONE NUMBER]"

If the user wishes, either during and/or after an active panic, if the circumstances of their crisis are such that the user may be able to speak out loud with the rescuers, the user may initiate a conference call to communicate with contacts and rescuers within the ULP application. After selecting conference call, the user may arrive at a screen which may list the user's emergency contacts, the rescue center, and the number of the nearest public rescue service to the user. Next to each contact, there may be a call button. After the user has selected one contact to call, the buttons next to each remaining emergency contact may change to add to call. When the user selects add to call next to any particular contact, that contact's phone may be dialed and added to the conference call. If available bandwidth is exceeded, the screen displays an option to automatically reduce the bit rate of the current phone connections. The user and rescuers can either engage in a standard audio phone call, and additionally they can engage in a video conference call if the participants possess suitable devices and sufficient bandwidth capable of participating in video conference calls. If only certain rescuers possess a phone capable of conducting a video conference call but other participants in the conversation do not possess video conferencing capabilities, those participants may communicate with the video conferencing participants via their standard audio phone, and are able to hear the audio and contribute audio to the conference call.

In addition to the user's capability to initiate a conference call, rescuers may also possess this capability to initiate video and audio conference calls via the mobile and desktop websites. On the emergency contact info screen, as with the user's application, rescuers may select a listed emergency contact and then press "add to call. If the rescuer's laptop or other computer contains a video camera, microphone and at least one sound speaker, any rescuer may have the ability to orally speak with and see live streaming video of several fellow rescuers. As with the user application, on the website, the bit rate of the phone communication may automatically adapt based upon the available bandwidth.

In certain embodiments, when the user selects panic message status, they may be prompted to enter their password. If they enter the correct password, a pop up screen may appear showing whether or not the panic SMS and email messages were successfully sent. For instance, if the user is in an area with low or no cell phone signal, it may be possible that the emergency messages were not yet successfully sent. In such cases, the application may constantly reattempt to send the messages as soon as cell tower, WIFI or other internet signals become available.

In certain embodiments, if the user enters the designated false password, when the user selects panic message status, a pop up screen may appear which may read, "no panic triggered—no messages sent." This may be the case regardless of whether or not the user actually has adequate cell tower or WIFI signal to send a message. This may be meant to deceive an attacker into believing that help is not on the way, regardless of the truth. If the user so chooses, they may change the preferences for the designated false password, so that the pop up screen after a false password has been entered may read, "photos and messages sent."

In certain embodiments, when test panic mode is selected in the application, the user may be presented with the same panic modes as are normally present on the ULP application home screen, but in this case, they may only be test versions of the panic modes. The test panic mode may include test silent panic 2, test loud panic 4, test medical panic 6, and a test safe journey 8. When the test panics are triggered, the functionality may be nearly identical to the non-test version of the same panic mode as mentioned above. However, in certain embodiments, the following may include a set of differences:

A) Instead of the standard SMS panic message, in a test panic, the following SMS panic message may be sent to the emergency contacts, but not to the rescue center, and this message may contain the same unique clickable web link to locate the user: "Only a test. If I were in true danger I'd need you 2 call 911 & tell them 2 locate & rescue me @ http://www.LocateLovedOne.com/[UNIQUE USER NAME]"

B) Instead of the standard email panic message, the following email may be sent to all emergency contacts, but not to the rescue center:
Subject—"test panic from [USER'S FULL NAME]"
Email body—"Hello [NAME OF EMERGENCY CONTACT],
This email a test panic message from my rescue system called Ultimate Life Protector®. This is not an emergency. If this were a real emergency, I would need for you to immediately call 911 and tell them to locate and rescue me at the following website below. You can click on it now to learn my location, hear audio, among other resources which could be used in a real emergency. Please explore the website now so you can learn how you can help during an emergency.
http://www.LocateLovedOne.com/[UNIQUE USER NAME]
Thanks for agreeing to help me if I'm ever in danger!
[USER'S FULL NAME]
[USER'S CELL PHONE NUMBER]
[USER'S EMAIL ADDRESS]"

C) Even after arming the rescue center, if the user triggers any panic from the test screen, no test panic messages may be sent to the rescue center.

D) If the user selects test safe journey, the timer and monitor work as normal, but if the countdown reaches zero, the above test panic messages may be sent to the emergency contacts but not to the rescue center.

In certain embodiments the user may view and alter the preferences by selecting general preferences from the more menu within the ULP application:

A) Screen sleep may be disabled during ULP use, to keep the application screen at the ready by deactivating screen sleep in the preferences. In this case, the screen may dim, but may still remain on, so that when the user taps the screen once, the screen brightness may return to the previous brightness setting. This may allow the user to tap loud panic on the app screen whenever the user has the need to deter an attacker, such as a date-rapist, for instance. With the screen sleep disabled, the user is not required to awaken the screen and unlock it before selecting loud panic, or any other function available on the screen. As previously mentioned, the user may trigger a loud panic without interacting with the smart phone screen if they possess a panic trigger device such as the panic trigger ring. If the user clicks the panic button the designated number of times in order to trigger a loud panic, the user may only be required to take their phone out of their pocket or purse and to aim it at an attacker after the button has been pressed the designated number of times, at which point the pictures and video may be taken, the audio alarm may sound and the light may be emitted, among the other loud panic functions previously described.

B) Default mode may be for a pop up screen to appear after the ULP application has been running for 60 minutes, to remind the user that ULP is still running. If the user is safe, they may quit the application. This notification may be deactivated in the preferences of the application.

C) Default mode may be for location pings to be sent at designated intervals such as every 30 seconds during normal use, during a panic. When the battery runs below ⅓ remaining power, a low battery conservation mode may automatically take effect, which may restrict location pings to be sent after longer time intervals have passed such as once every 3 minutes, and may restrict further video, audio and other information transmission. Further, during the active power conservation mode, the screen may sleep when the user is not using it, regardless of the screen sleep setting above in (A). The user may deactivate low battery mode in the general preferences. If deactivated, pings may continue to be sent at the designated interval such as every 30 seconds, and all other available functions may continue to operate until the battery may be fully depleted.

D) Default mode may be for safe journey timer to not require a password to cancel the countdown when the user safely arrives at their destination. If the user wishes to require that the correct password be entered before canceling the safe journey timer countdown, they may choose to require a password in the preferences of the application.

E) The default emergency service phone number may be 911. For users in countries other than the U.S. with different government emergency phone numbers, such as 999 in the UK, users may enter the appropriate emergency phone number for their country within the preferences of the application.

F) The default panic when the button is double pressed may be silent panic. If the user chooses, within the general preferences, they may select a different panic to trigger as the default. For instance, a user with a severe heart condition might choose medical panic as default. In this case, after the user double presses any available panic button, a medical panic may be triggered, and if the user is wearing the pulse monitor ring accessory, for instance, medical professionals can monitor the user's pulse before they arrive on the scene. As an example of an appropriate time to set loud panic to be the default panic, a teen age girl may set loud panic as the default before attending an unchaperoned party, to deter potentially intoxicated and aggressive males if they were to attempt to physically assault the user. If loud panic was initially set as the default panic mode to be triggered when the button is double pressed, but the user unexpectedly finds herself to be in a predicament which calls for a discreet silent panic, in such a case, the user may override the default loud panic in order to trigger a silent panic by pressing the button the designated number of times more than twice.

G) The user may have the option to create customized panic modes, to be accessed by pressing the panic trigger ring the designated number of times, and also for the related customized modes to be available as buttons on the application screen which describe the anticipated crises. For instance, if the user suffers with a serious asthma condition, in the preferences, as an example, users may create a custom asthma attack button which may appear on the screen. Further, the user may designate a certain number of button presses as the designated number of button presses required to trigger a customized asthma attack panic. In cases where the user may be unable to speak during an asthma attack, they may press the button the designated number of times in order to trigger the customized panic mode, instantly conveying the nature of the crisis to rescuers without requiring the user to speak. The user may create multiple customized panic modes for several possible crises such as peanut exposure, bee sting, chest pains, and the like.

A preprogrammed SMS capable cell phone number and an email address directed to the rescue center may appear by default within the application of the present invention. When new software versions of ULP are released, if the rescue center phone number and email have changed, the new contact information may be updated into the software. ULP may establish the correct cell phone number and the correct email address with which the user may contact the rescue center. This contact info may be automatically present within the software, and if any contact info relating to the rescue center changes, the software may be automatically updated to include these changes, so the rescue center may always receive panic messages after a panic is triggered while the rescue center is armed.

In certain embodiments, it may also be possible for the user to customize the rescue center phone number and email address. One situation in which it might be appropriate for users to customize the default rescue center contact info may be in cases where a student enjoys 24/7 protection by a dedicated campus security organization. In such a case, the user may enter the contact information for their specific campus rescue authorities, so if the rescue center is armed as the user triggers a panic in a case where the user enjoys 24/7 protection by a dedicated campus security organization, campus security may be dispatched to rescue the user.

When the user triggers their very first test panic after signing up for the service and entering emergency contact info, an invitation email may be sent to all the new emergency contacts. In the aforementioned case of a college student, campus security may receive the invitation email, the security service may communicate with the user, and this campus security service may learn how to take advantage of ULP rescue features in order to rescue the user if campus security receives a panic message from the user in response to a crisis.

If the user determines her situation to be such that she may be able to orally speak with the rescue center during a crisis, the user may speak with the rescue center directly by pressing the call rescue center button in the menu items of the application. In such cases, the rescue center may talk to the user while providing instructions and comforting the user while arranging for the rescue to proceed.

In certain embodiments, there may be a light version. For users who sign up for this light service, the ULP rescue center may not be available to the user, but the user may be offered the option to enter contact information for a primary rescue center such as the aforementioned campus security information.

In certain embodiments, if the light user disarms the primary rescuer, when the user triggers a panic, only the designated emergency contacts may receive the panic messages. The designated rescue center, such as campus security if applicable, may not receive panic messages during panics where the rescue center is disarmed. When the rescue center is armed, either the default ULP rescue center, or for light users, the designated rescue center may receive the panic messages. In another case, when a light user arms the primary rescuer, for instance, if the user has a known medical condition, they may enter their doctor's contact information in the primary rescuer field, so it may be understood by the panic message recipients including the doctor that, after the user has pressed the panic button the designated number of times more than once, the message recipients including the doctor may be informed that the user may be experiencing a medical emergency related to his known medical condition. In another example, a light user may lack access to a campus security organization and also not have access to a doctor, such a user may enter their own parents or other relatives into the customized rescue center field. In such a case, the user's loved ones may comprise the designated responders if the user triggers a panic.

In certain embodiments, when the user first installs the application of the present invention, the user may be prompted to enter the cell phone numbers and email addresses of their family and close friends whom the user has determined to be the most appropriate people to receive panic messages when the user triggers a panic, and these designated message recipients may agree to act in order to rescue the user during such circumstances. Within the preferences of the application, the user may add additional contacts to the list and edit the existing contact information at any time. Users may be required to enter the correct password before altering the contact list and before altering other significant settings.

When the user first installs the application of the present invention, the user may be prompted to enter their own key information in order for it to be available to rescuers in case of emergency. Users may update this information within the preferences. The information which the user may be prompted to enter may include at least the following: the user's full name; a recent photo of the user's face, the user's home address; the user's email address; the user's cell phone number; any pertinent medical information such the user's as blood type, allergies, bee sting allergies, asthma, and the like.

When the user first installs the application of the present invention, the user may be prompted to take a picture of themselves with their phone. This user photo may be displayed on the rescue website, thereby enabling rescuers to identify the user during an emergency. After the user takes the photo, before transmitting it to the ULP server, the user may view the photo to determine if it is usable. If the user wishes, they may retake the picture until the user may determine that a satisfactorily clear picture has been taken.

Further, users may return to the user photo section at a later time, to take a new photo of themselves. After the user may be satisfied with the new picture, the user may upload the picture to the rescue website. For smart phones which include a self-facing camera enabling the user to view themselves on the mobile device screen while taking the picture, this mode may automatically be used when such a self-facing camera is present, and when the user arrives at the user photo screen via the more menu, the existing user photo may be displayed. If the user selects the take a new photo button, the screen may change to become a live viewfinder, and when the user selects a take new photo button, the photo may be taken, at which time the user may assess the suitability of the new photo, and if approved by the user, the photo may be sent to the website.

For users with mobile devices which do not include a self-facing camera, the front-facing camera on the cell phone may be used. In such cases, a pop up screen may appear which may read "It's easiest to take your photo in front of a mirror, so you can see the phone's screen in the mirror. This way, you can make sure your face is centered." The user may close this popup window after reading the message. When the user selects a snap photo button from the screen, the new photo may be taken. Once the user transmits the approved photo, rescuers may see this photo on the user's website after any panic is triggered.

In certain embodiments, when the user arrives at the "pair with Bluetooth® accessories" menu option, the user may be prompted to prepare all related Bluetooth® accessories for pairing. This may be done by placing the devices in pairing mode. Once the accessories are findable, the ULP smart phone application may locate and pair with the devices. Once the devices are paired for the first time, the smart phone may always recognize these accessories whenever the accessories reside within the Bluetooth® range of the smart phone. For example, the range may be within 15-30 feet.

The physical accessories which may be paired with the user's smart phone may include, but are not limited to: a Bluetooth® or other wireless-enabled panic ring trigger; a Bluetooth® or other wireless-enabled attachable panic trigger device with the ability to clip onto the user's clothing or keychain, and the like 52; an ear-mounted video camera 54 with panic button and microphone; a pulse monitor bracelet with panic button, microphone, accelerometer, among other features; a brainwave monitor; a breathing monitor; a medicine distribution chamber; automatically activated electrical cardiac resuscitation pads; nano probe blood monitors; a wireless magnetic charging and blood probe interface pad; and a transdermal medicine distribution patch.

The present invention may further include instruction. Within the instructions which may take multiple forms including video, text, audio, animation, charts and various other media, users may be directed to experiment with the test panic function numerous times in order for both the user and the designated contacts to gain experience with the system. The instructions may also broadly explain what ULP does, and how each function works in minute detail. The instructions may contain key information needed for new users to begin learning more about ULP, crucially without contacting the rescue center as the user and their contacts experiment with the present invention. Users may be provided with a web link which they can use to view the instructional information on desktop, laptop and tablet computers, and internet enabled TV screens for easier viewing. Within the instructions, an invitation may be offered for users to become active within the ULP user community, where a plurality of ULP users may communicate with each other in order to answer questions, share stories and the like. A ULP webmaster may monitor the communications and provide solutions and insights to the user members. Users may also be offered an email address where they may send queries directly to Ultimate Life Protector, LLC, and also a phone number for verbal technical or other assistance.

The mission statement and contact info for the ULP company may appear as an option to be viewed within the more menu. Frequently asked questions may be listed along with answers. A web link may be provided to the ULP sales and company website which may be completely disconnected in functionality and server origin from the rescue website.

In certain embodiments, the present invention may include a panic trigger ring which may be worn on one of the user's fingers, or alternatively it may be attached anywhere on their person. When users wear the ring on their middle or ring finger, this may allow the user to trigger a panic more discreetly than by any practical alternative physical panic-triggering method, because the human thumb easily touches the middle and ring finger while being well hidden behind the user's index finger.

When worn on fingers as described above, the water proofed panic ring may be constantly available to users at all times, including when they are in bed or in the shower. If an attacker were to suddenly appear behind the user and hold a knife to the user's throat, the ring may allow the user to remain very still while discreetly tapping the button with their thumb, without alerting the attacker to the movement. If an attacker were to demand that the user puts up their hands, with the panic ring on the user's middle finger, ring finger and even pinky finger, the user may still discreetly click the button with their thumb, without making the attacker aware of the clicks because of the undetectably minuscule movement needed for the user to press their thumb against their fingers. This method of physically triggering a panic may be extremely discreet and easily accessible at all times.

The ring may contain features similar or identical to features of other panic trigger devices described herein including at least one of the following:

The ring may possess a low energy Bluetooth® or other wireless signaling capability, allowing the ring device to send various distinct Bluetooth® or other wireless signals to the user's smart phone. The specific signal sent may be determined by the number of times the user presses the panic button, which may reside on the outside of the ring, and may ideally be worn on the middle or ring finger so that the user may discreetly press the button with their thumb at any and all times. As with all panic trigger devices designed for use with the present invention, it may be necessary for the user to click the button at least twice, to help ensure that the button press is intentional.

Further, when the user clicks the panic ring button, the device may be built in such a way that the button is initially difficult to press, because there may be strong resistance via an object which may act as a spring mechanism, constantly providing outward pressure on the button. The user may be required to press the panic button with sufficient force to counteract the outward pressure being exerted on the button before a click may be registered by the device. This resistance may be included to reduce the likelihood that the button may be clicked unintentionally by the user. It may be intended that the click is only registered after the user consciously decides to click the panic button more than once.

The distinct wireless signal sent may be determined based upon the number of times the user clicks the button. For instance, when the user clicks the button twice, a standard panic may be triggered which adheres to the protocols of whichever mode is currently active, including modes such as armed mode, test mode, silent panic mode, loud panic mode, bad date mode, medical panic mode, a plurality of customized panic modes, among others.

After the user clicks the button a designated number of times more than two, a different wireless signal may be sent to the user's smart phone, which may activate a different mode which overrides the originally active mode which may be activated when the button is clicked two times. The user may memorize multiple button-click numbers, so that during a sudden crisis, the user is able to rapidly activate whichever specific panic mode they deem to be most appropriate to cope with their particular situation.

Some panic modes which may be triggered when the panic button is clicked a designated number of times may include numerous different modes such as; a loud panic which may be used to deter date-rapists; a bad date panic which may be used to notify designated contacts that the user is uncomfortable with their present situation but the problem has not yet escalated to the point where the user may be thought to be in physical danger, hence the rescue center may not be contacted in such a mode; medical panic mode which may inform rescuers that the crisis is of a medical nature hence the summoning of an ambulance may be the appropriate response; among others.

The ring power, similar to other devices described elsewhere in this patent application, may act in the following manner:

There may be no switch with which to power the ring on or off. The ring may always be powered on, using extremely low battery power needed to maintain a clock function during deep sleep, and to maintain a connection to the user's smart phone. If the user presses the button at least one time, or more times depending on the particular mode the user wishes to engage, the ring device may rapidly awaken from deep sleep, and may immediately send the desired Bluetooth® or other wireless signal to the user's smart phone device, triggering the designated function from with the application.

After designated intervals of time in deep sleep elapse, the ring may be programmed to automatically awaken from deep sleep to perform a diagnostic test in order to determine the amount of power which remains in the battery. If the test determines that the remaining power supply is greater than one-third of the total power capacity, the device may automatically re-enter deep sleep mode, and remain in deep sleep until either the next scheduled power diagnostic test, or until the user presses the panic button. The use of deep sleep and low energy Bluetooth® or other wireless signaling may enable the device to retain a usable power supply for several months before requiring a recharge or battery replacement.

During any scheduled power diagnostic test, if the ring determines that there is less than one-third of power remaining, the ring may send a Bluetooth® or other wireless signal to the user's smart phone which may initiate the sending of messages to the user and may include their designated contacts, notifying the message recipient(s) that the ring battery requires either recharging to replenish its dwindling power supply, or additionally that the battery may need to be replaced. The messages sent to the user and other designated contacts may be transmitted via any commonly used smart phone message transmission methods including SMS, email, and any other widely available methods.

As with other panic triggers described herein, the panic button may have sharp edges which allow the user to easily feel the contours of the button without requiring the user to look at the button to locate it. By merely feeling for the button with their thumb, the sharp contours of the protruding button edge may enable the user to locate and press the button without using their eyes.

When the user successfully depresses the button so that it may be registered as clicked by the device, the act of pressing the button may cause a tactile click vibration which may enable the user to physically feel and confirm that the click was successfully registered.

In certain embodiments, the ring may contain a vibrate function in order to notify users when a panic has been successfully executed, as well as to notify them of other events which may include the arrival of rescue personnel, to notify the user that their smart phone or ring power is running low, among other useful notifications. Distinctly different sequences of vibrations may differentiate various notifications received as the user feels the particular sequence of vibrations. The ring may be designed in a waterproof sealed casing, so that no internal electronics are exposed to liquids if the user's hand enters water or other liquids.

In certain embodiments, the ring may contain a microphone and a processor which may detect designated verbal phrases, wherein a designated phrase may cause a designated panic signal to be sent to the user's mobile device. Further, the microphone on the ring may provide clearer audio when compared with a microphone on a mobile device which may be muffled due to being in the user's pocket when the verbal phrase is spoken.

In certain embodiments, if the user chooses to enable the pulse monitoring capability of the device, the ring also may constantly monitor the user's pulse, automatically triggering a medical panic by sending a Bluetooth® or other wireless signal to the user's mobile device if the user's pulse were to stop or become dangerously irregular. As with the previously described pulse monitor, the ring device may automatically determine that it is being correctly worn by the user, and in cases where the ring may be taken off, the ring may automatically determine that it has been removed from the user's finger, rather than falsely determining that the user's pulse stopped.

In certain embodiments, users may also choose to activate the personal activity and complex health statistics monitoring via the ring device, which may automatically gather and display numerous health statistics and analysis which may be viewed at the following Internet website: www.healthprotector.us/[USER NAME]. In addition to viewing the Internet website, users may also receive daily email which may include detailed statistics gathered by monitoring the user's levels of physical activity and rest throughout the day, along with pedometer statistics, sleep analysis, average blood pressure, and other related tests. Alongside the detailed analysis, the user may be provided with a general summary of their basic activity levels throughout the day and night. Users whose activity levels may have fallen below certain targets may receive a reminder to increase their activity, address high blood pressure, and the like.

The following describes in detail one of several additional panic trigger devices of the present invention. In certain embodiments, the device may include a thumb or smaller than thumb sized, rechargeable, portable panic trigger device. The device as illustrated in FIG. 22, may be designed to be highly portable. As shown in FIG. 22, a small LED 66 may be present in the center of the panic trigger device 68. When the battery needs recharging, in addition to other actions described below, the LED may blink with a red light continuously until the user recharges the device. When the user successfully pairs the panic trigger device with their smart phone, the LED 66 may flash with a green light for several seconds. The panic trigger 52 is illustrated in FIG. 22. This panic trigger or button may be the only button on the front of the device, so the user may never be confused as to which button to double-press during an emergency.

Figure 23:
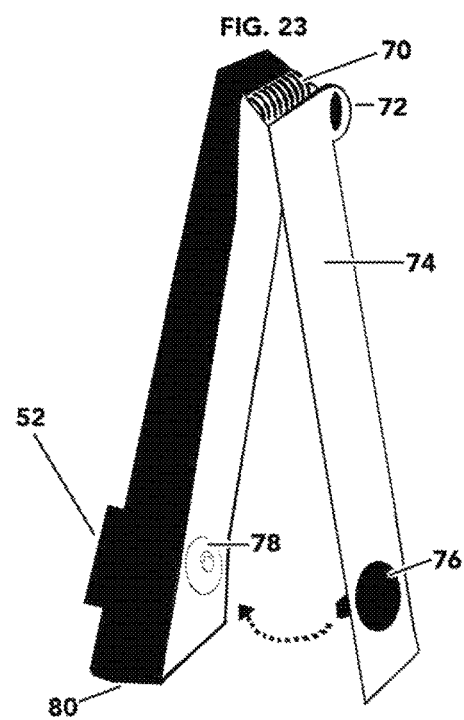
FIG. 23 is a side view of the panic trigger device of FIG. 9 with an exemplary metal clip.

The device may contain several physical elements with which the user can attach the device to their person. As illustrated in FIG. 23, a metal clip 74 is attached to the rear of the device, allowing the user to clip it to their belt, pocket, waistband, shirtsleeve, pocketbook strap, backpack strap, or anywhere else a clip can be attached. A tightly wound spring 70 may reside at the top of the clip, exerting constant pressure to close (or seal) the clip. A snap button 76, 78 may be present at the bottom of the clip 74. For example, the button 76, 78 may include a male snap button 76, and a female snap button 78, which may abut the electronic trigger device. The user may insert thin clothing in between the button snaps, and then snap the button closed over the user's clothing. This firmly attaches the device to the user's clothing. A user may snap the button closed at the wrist area of their shirtsleeve, for instance, and the device may remain securely in place, and always readily available to trigger a panic. Another option is for users to insert a pocketbook or purse strap in-between the clip and close the button snaps. The device may be firmly attached to the pocketbook strap, backpack strap, or other object which the user always tends to have with them at most times.

If the clothing material is too thick to enable the button snaps 76, 78 to close, for instance if clipped to the waist of a user's denim jeans, the device may remain firmly in place because the clip 70 may have a tightly wound spring that may exert constant pressure to close the clip.

As illustrated in FIG. 23, the metal clip 70 may also contain an opening 72 which the user can attach to their keychain.

Figure 24:
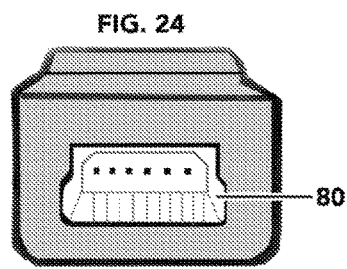
FIG. 24 is a bottom view of the panic trigger device of FIG. 9 with an exemplary USB port.
Figure 25:
FIG. 25 is an perspective view of a standard USB cord that may connect to USB port of the panic trigger device of FIG. 24.

As illustrated in FIG. 24, a female USB port 80 may be present at the bottom of the device. This port 80 may be used to recharge the device by connecting it to a computer or other USB charging station with a standard male-to-male USB cable as illustrated in FIG. 25. In addition to recharging the battery, this USB port can also be used to upgrade the firmware of the device if and when company officials create and distribute improvements to the firmware to the users.

The user may pair the device with their smart phone once, and after this precedent, the smart phone and designated trigger device may permanently recognize each other when the smart phone enters the range of the Bluetooth® or other wireless signal, enabling the smart phone to rapidly receive and act upon panic signals sent to it by the panic trigger device.

To trigger a panic with the physical button of the present invention, the user may double-press the panic button 52. It may not be necessary to power the device on first, before pressing the panic button. This and other power related details are explained below. When the button is double-clicked, a panic signal may be sent to the pre-paired smart phone. Double-press, also known as double-click, may be used to prevent most accidental panic triggers. If the user sits on the button, for instance, a panic is not be triggered. Once the panic signal is successfully received by the smart phone, the Bluetooth® or other wireless trigger device 68 may vibrate. This vibration may serve as confirmation that the panic has been successfully triggered. With this feature, the user can be discreetly reassured that professional rescuers are on the way, without alerting a potential attacker.

The panic button 52 on the device may be designed to be felt with the user's fingers, without looking at the button. In other words, the device can be attached to the user's belt or outer pocket, and the user can feel the button 52 without looking at it, because it may protrude and may be tactile and sharp edged for the user's finger, so they can locate it, feel it, and double press it to trigger a panic discreetly, without the user needing to turn their head to look at the button, so it can be pressed discreetly, without a potential attacker noticing. When the user presses the button 52 at least twice, the button may click in a tactile, noticeable way. In other words, when the user presses the button, a physical click is felt by the user's fingers, so they can be aware that the button has been successfully pressed.

In certain embodiments, the panic trigger device 68 of the present invention may be designed to be smaller than a standard adult thumb size. The size listed may enable it to conveniently attach to any desired part of the user's clothing, for instance the wrist area of a shirtsleeve, for easy and constant access to the device in case of emergency.

The trigger device of the present invention may only be used to trigger the panic from the application on the smart phone. An additional advantage to housing the aforementioned features on the phone rather than on the trigger device is so, if a potential attacker notices the trigger device, they can seize it and destroy it, but this does not interfere with the rescue, because the location, audio and other data continue to stream from the user's smart phone, which may remain hidden in their pocket or purse during the entire crisis. It may not be necessary for a user to physically interact with the user's smart phone during any portion of the crisis event, in order to trigger a panic which includes all the features described above. In short, attackers may be most likely to notice and destroy or throw away the trigger device because that is the device the user is using/interacting with, but after the panic has been triggered, there is no longer any need to posses the trigger device for the rest of the rescue. An attacker may throw away or destroy the trigger device, while the user's hidden smart phone may continue to silently gather and transmit all data needed to rescue the user.

This panic trigger device of the present invention as illustrated in FIG. 22 may be designed to permanently remain in a deep hibernation, regarding the power. Therefore the device may never power off and may be always powered on, at an extremely low level of power usage, only using the power needed to maintain a running internal clock, and to maintain a wireless connection with the user's smart phone. When the user double clicks the panic trigger button 52, the following sequential events, as an example, may begin:

A) The device fully powers on.

B) The device sends the designated panic signal to the pre-paired smart phone via Bluetooth® or other wireless method.

C) The device vibrates when it receives confirmation from the smart phone that the signal has been successfully received. This vibration informs the user that the panic has been successfully triggered.

D) The device reenters deep power hibernation.

In certain embodiments, the device may be scheduled to periodically automatically power itself fully on, to run a self-diagnostic process to assess the current state of the power supply. In certain embodiments, if the diagnostic process determines that the battery contains more than ⅓ remaining battery power, the device may reenter deep power hibernation. In such embodiments, if the button contains less than ⅓ remaining battery power, the device may not reenter power hibernation, and the LED light at the top of the device may constantly blink brightly with a red color, to notify the user that the battery is running low, and the device must be recharged or the battery must be replaced.

In certain embodiments, if the diagnostic test reveals that the battery has reached less than ⅓ remaining power, the panic button device may send a signal to the user's smart phone, instructing the smart phone to send an email and SMS to the user, reminding the user that it is time to recharge their panic button device or to replace the battery. After the panic button has been fully charged, a different SMS and email message is sent to the user, notifying them that the device is now fully charged. This deep power hibernation solution may enable the device to function without recharging for several months, which may enable the user to attach the device to an item which is with them and usable at all times for several months. As mentioned above, since the user is automatically reminded when the device must be charged, the user may be free to ignore the existence of the device until it is needed, because the automatic reminders may help ensure that the device always contains adequate power with minimal user thought and minimal need for user intervention during extended safe periods where no panic may be required.

In certain embodiments, the present invention may include a scalable server. A web server may be commissioned and configured to facilitate data exchange between the user, designated contacts, the ULP 24/7/365 rescue center and a dedicated mobile/desktop website. The server capacity may be predetermined to be instantly and automatically expandable, so that a sudden increase in usage may cause an automatic transfer of the necessary resources to increase server capacity sufficient to serve the increased demand.

In certain embodiments, a dedicated mobile and desktop website may serve as the central data clearinghouse, where all data useful in facilitating the user's rescue may be available to rescuers and loved ones. When the user triggers any panic, the designated contacts and the ULP 24/7/365 rescue center may receive an SMS and email nearly instantly, indicating that the user is in grave danger.

Inside the SMS and email, the individual user's own unique clickable web link may be automatically provided. As illustrated at the top of FIG. 26, the user's unique web link may bring them to the rescue website. An example of the format of the web link may include: "www.LocateLovedOne.com/[UNIQUE USER NAME]". Those who receive the message with the embedded clickable web link may simply call either 911, or may also call the nearest governmental rescue precinct to the user if the user is in an area where the worldwide local database of governmental rescue precincts provides for the user's particular location, to instruct them to visit the user's website. In other words, the ULP database of local governmental rescue precincts, such as police and ambulance services, can provide the panic message-recipient with the nearest police and ambulance contact information 104 to the user's current location, as illustrated in FIG. 26.

In certain embodiments, if the SMS panic message recipient lacks access to the internet because they may use an older model of flip phone or non-smart cellphone, the message recipient/rescuer may still receive the SMS text information including the URL for the rescue website, therefore non-internet enabled flip phone SMS recipients may call 911, and instruct 911 to view the user's aforementioned unique web address because the user faces danger. Emergency contacts may explain to the 911 operator that all ULP users understand that triggering a panic is an indication that they face danger, and that they need to be rescued.

Once professional rescuers have been rapidly notified of the crisis, and are given the user's unique web link, with their own smart phones and desktop or tablet computers, the rescuers may be instantly armed with the following array of data points and resources which can be used to rapidly facilitate the user's rescue from any number of dangerous crises such as at least one of: user's current location; nearby emergency dispatch contact information; user's location history; user's previous route path; audio; directions to the user; photo/video from the scene; ear-mounted vantage-point audio/video camera; tracking of multiple users in family mode or institutional mode; photo of the user; emergency contact info; instant text chat amongst rescuers and/or users, instant verbal and video communications amongst rescuers and/or users; user medical info; panic status; user's home address; pulse monitor; toxin monitor, bio monitor, accelerometer, pedometer, g-force monitor, barometer, thermometer, GPS and other location monitors, radiation monitor, brainwave monitor; breathing monitor; nano-blood probes; medicine distribution patches; electrical cardiac resuscitation pads; and the like.

As illustrated in FIG. 26, the user's location 24 may appear in the center of the desktop website as a brightly colored icon labeled "help me" which may appear in the center of the map. The mobile website with the same information is shown in FIG. 27. Every few seconds, when the user's location is updated, the help me icon may move to the user's updated position. In certain embodiments, if the rescuer accidentally scrolls away from the help me icon on the map and loses track of the icon, the user may select user's current location button 82, 108 on the desktop website, as illustrated in FIG. 26 and on the mobile website, as shown in FIG. 27, after selecting the press for menu items button at the top of the mobile screen, the mobile website menu items 132 may be shown, as illustrated in FIG. 28.

When selecting the user's current location option on the website, the HELP ME icon may center on the map. The local emergency dispatch database may include the following: a comprehensive database may be used which may contain contact information for all local, professional, governmental emergency dispatchers, which data are stored on the dedicated server, for nearly all localities and municipalities worldwide. After the user's location has been determined during a panic, the nearest governmental rescue precinct contact info 104 may be gathered from the server, and the phone number and other contact information for that local precinct may be displayed on the website, at the top of the map, as illustrated in FIG. 26. The designated contacts and the 24/7 ULP rescue center may immediately contact the local governmental rescue dispatcher nearest to the user after seeing the contact information as they arrive at the rescue website. For users in countries where governmental forces might be oppressive and antagonistic towards the user such as in war zones, the user may change the preferences so that their own customized emergency contacts and chosen rescue centers may receive the panic messages rather than the governmental forces, when the user deems this to be appropriate.

In certain embodiments, when rescuers select the user location history button 84, 130 on the mobile and desktop websites, as illustrated in FIG. 26, and FIG. 28, a screen may appear which shows the user's previous locations, in increments of several seconds. An approximate street address and the latitude/longitude coordinates for the user's location may be shown with each data ping, as illustrated in FIG. 29. The user may adjust the frequency of the sending of the location pings within the preferences. A higher frequency of pings per minute may improve the rescuer's awareness of the user's latest location but it may also use additional battery power. The default setting may be for the pings to be sent in 30 second increments.

Using the present invention, rescuers may see colored lines on the map which represent the user's past movements and current movements. On the mobile website, as shown in FIG. 28, the user selects view route path button 128 from the menu items, and the colored lines may appear on the map. On the desktop website, the colored lines representing the user's previous movements may appear on the map automatically. These colored lines may be easily seen on the website.

After any panic is triggered, audio may be recorded live from the user's smart phone, and the audio signal may be streamed to the website. Each separate audio recording may be listed on the website with the time and date of the audio recordings. Rescuers may listen in near real-time to audio from the scene of a crisis, by selecting the audio from the scene button 86, 126 on the desktop website, as illustrated in FIG. 26 and FIG. 28, or by selecting the audio from the scene button on the mobile rescue website. When the rescuer selects the audio from the websites, they may view all listed audio files with the time and date shown. When the rescuer selects any of the displayed audio files on the mobile and desktop websites, the audio player appears as illustrated in FIG. 30. The audio counter on the audio player may appear as a clock. This may enable listeners to note the time of day when each moment of the audio recording took place, which can provide data to investigators, both during and after the crisis. When the rescuer rewinds the recording, the clock may also rewind, showing the time when that earlier portion of audio took place. Rescuers may be able to listen to the near-live audio as it continues to stream, and may also be able to rewind to earlier portions of the recording, as new audio continues to record and transmit. The rescuer may return to the most recent, near-live audio by forwarding to the end of the available recording. From there, near-live audio continuously streams as long as the panic remains active, onto the rescuers mobile smart phone, tablet, desktop, laptop or any other Internet-enabled device.

Rescuers and emergency contacts may be instantly given directions to the user's location. Rescuers may select/press the help me icon 24 on the rescue website map as illustrated in FIG. 26. A blank address-field may appear after the help me icon 24 is pressed, as illustrated in FIG. 31. The rescuer may enter their own current address, and the user may be provided with turn-by-turn directions to the user's current location, as illustrated in FIG. 32. Colored lines on the map may represent the suggested route to the user. These colored lines may be easily seen on the website, but impossible to see in the submitted black and white drawings and screenshots herein.

Figure 33:
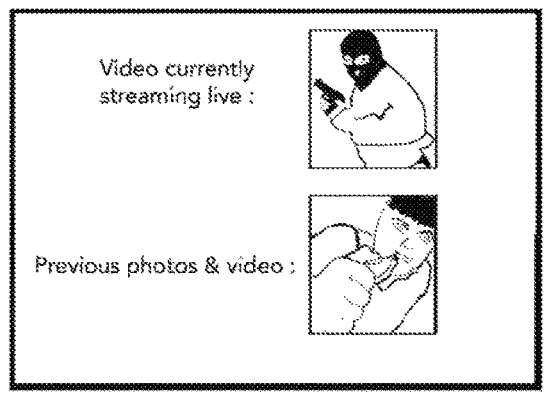
FIG. 33 is an exemplary representation of the present invention after a user selects the photo/video button of FIG. 28 or FIG. 32.
Figure 34:
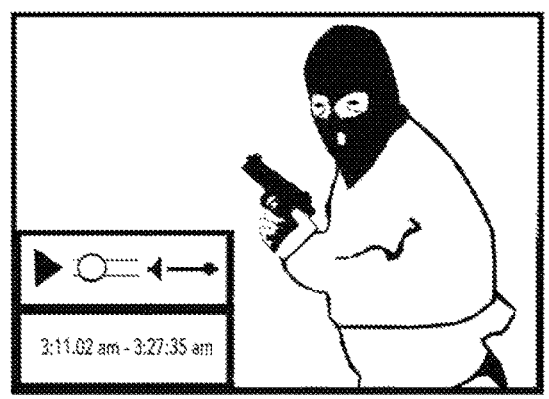
FIG. 34 is an exemplary representation of the present invention after a user selects the video currently streaming live of FIG. 33.
Figure 35:
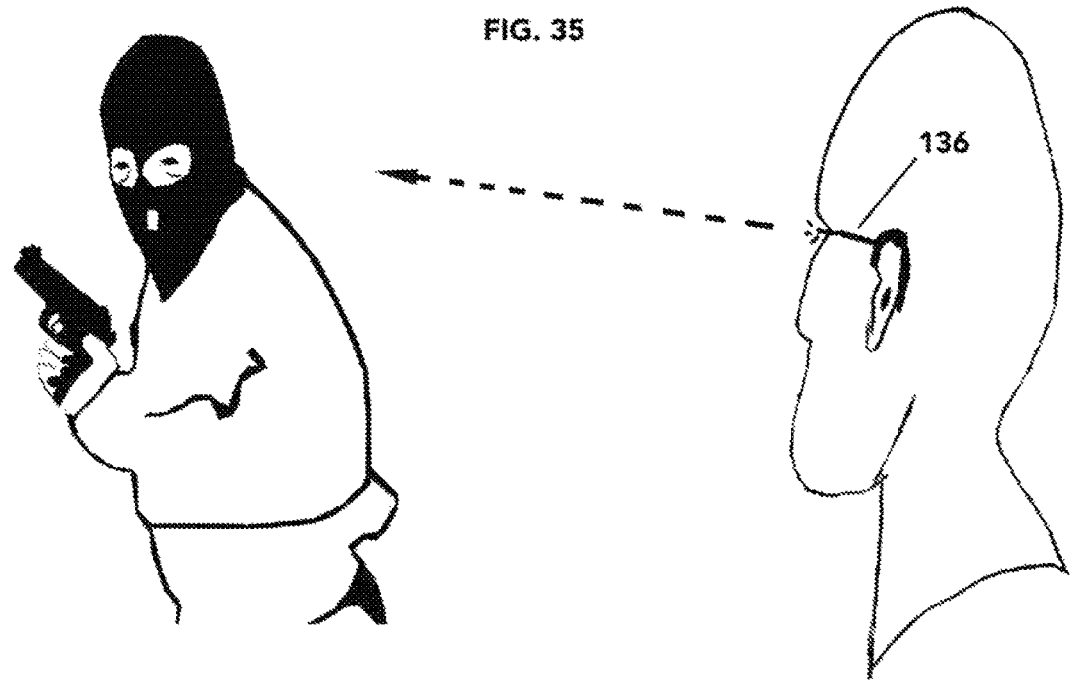
FIG. 35 is a perspective view of the ear mounted video camera of FIG. 11 taking video of an exemplary attacker.

In certain embodiments, when a panic is first triggered, the user's smart phone may take a photo and send it to the website. If the user possesses the optional ear mounted video accessory, rescuers may view near real-time video from the user's vantage point. The video signal may be transmitted from the ear-mounted device via Bluetooth® to the user's smart phone, and the smart phone may stream the video data to the mobile and desktop websites. When the rescuer selects the photo/video from scene button 124 on the mobile and/or desktop websites, if video and/or photos are available, they may be displayed as thumbnails, as illustrated in FIG. 33. When the rescuer selects one of the available video thumbnails on either website, the video player screen appears, as illustrated in FIG. 34. On the desktop website, if the user has streamed video in a panic, the streaming video 98 may automatically appear on the website, as illustrated in FIG. 26.

If the user possesses the designated ear-mounted audio/video/trigger accessory, rescuers may be able to view near real-time video, from the user's precise vantage point. This may be achieved by providing a small, ear-mounted video accessory. In certain embodiments, the camera lens may be roughly the width of a paper clip, and may be designed to jut out in front of the user's ear, pointing forward. The device may snugly adhere to the wearer's ear. The camera angle may provide rescuers with video from the user's vantage point, which may greatly enhance the rescuer's understanding of the user's predicament. In addition to the audio and video, the ear-mounted device may also serve as an additional panic button. In certain embodiments, a panic trigger button may be available on the side of the device. The user may press the button the designated number of times for a panic signal to be transmitted to the user's smart phone via Bluetooth® or other wireless method. When the panic has been successfully triggered, the ear-mounted device may vibrate, to give the user confirmation that the panic was successfully triggered, and may also vibrate in distinct patterns in order to notify the user of useful information, where the particular pattern of vibration may be known by the user to mean that a particular notification may be conveyed by the vibration pattern.

In certain embodiments, the professional rescuers may be provided with a photo of the user on the website, which may enable them to identify the user during the rescue. As mentioned in the signup section, the user may be prompted to take a picture of themselves as they set up their profile. To view the user's photo, rescuers may select photo of user from the menu items on the mobile website. The user photo may appear automatically at the top of the desktop website. Underneath the photo, the time and date when the photo was taken may be listed.

When rescuers select "emergency contact info" on the mobile or desktop website, rescuers and loved ones may see the email addresses and cell phone numbers of all designated emergency contacts, the nearest police/ambulance and rescue center. When the rescuer taps on any phone number on their smart phones, the rescuer may be presented with the option to chat via text and or video, send an SMS or place a phone call to that person. If the rescuer selects SMS, they may be instantly transported to an outgoing SMS screen with the emergency contact's phone number automatically entered. If the rescuer selects phone call, the standard phone call screen may appear, and a call may be automatically placed to that contact.

After receiving the SMS and email panic message, all emergency contacts and professional rescuers may instantly communicate with each other in the designated text area on the home screen of the website, to share vital information about the user's predicament and previous plans. On the mobile and desktop websites, rescuers may simply enter their name in the chat field and then select a start button 106, as illustrated in FIG. 26. After selecting the start button 106, a standard chat window may appear. Various family, friends and professional rescuers may instantly share key information to help with the rescue. The emergency contacts may enter text at the bottom of the window, and after completing the message, they submit the text, and the message may be sent to the upper chat window, as is the standard format for instant messaging.

In certain embodiments, the user may initiate an audio and video conference call between themselves and the various rescuers. In addition to the user's capability to initiate an audio or video conference call with rescuers, the rescuers may also possess the capability to initiate audio or video conference calls without the user's participation, via the mobile and desktop websites. On the emergency contact info screen, as with the user's application, rescuers may select a listed emergency contact and then press an "add to call" button. If the rescuer's laptop or other computer is fitted with a microphone, video camera and speakers, they may orally and/or visually converse with several fellow rescuers at once. As with the user application, on the website, rescuers may automatically reduce the bit rate of the phone communication, if this becomes necessary for any reason including reduced available bandwidth reception.

In certain embodiments, on the mobile and desktop websites, rescuers and loved ones may be able to see medical information relating to the user, such as blood type, ailments, known allergies, and the like, by selecting the medical info button from the menu items screen. After selecting medical info, a separate window may open which contains all medical information which the user previously entered via the smart phone application. As mentioned above, users may be instructed to enter relevant medical information when they first sign up for application of the present invention, and the users may also update the text for this screen in the preferences section of the application.

As illustrated in FIG. 26, at the top of the website in an informational display box 96, the type of panic may be displayed (Silent, Loud or Medical Panic) the time the panic was triggered may be displayed, and it may be displayed whether or not the panic is currently active or inactive. It may also be displayed if the user sent a false alarm message, indicating that they accidentally triggered a panic. It may also be displayed if the user entered a designated false password, intended to mislead an attacker into believing that the user has canceled the panic.

As mentioned above, when the user has launched an "I am safe" signal, the following may be displayed in the panic status section of the website: "I AM OK at 7:36 AM, on 02/15/13. Call to confirm if you wish."

The informational display box 96 may be shown in the same area as all panic status updates, in FIG. 26. When the user selects the I am safe option or false alarm message option, the user's phone ringer may automatically increase to the maximum volume, to enable the user to hear phone calls from rescuers who will likely wish to call the user to confirm that the user is indeed safe.

In certain embodiments, further information may be displayed on the website. For example, the user's home address may be prominently shown on the website in addition to the user's cell phone number. The rescuer may tap the user's displayed cell phone number, thereby automatically navigating to the outgoing call screen on the rescuer's phone, with the user's displayed cell phone number entered into the outgoing call field. The rescuer may only need to press the call button in order to place the call to the user. On the mobile website, rescuers may learn the user's home address by selecting the address of user button 114 as illustrated in FIG. 28. If the user has the optional pulse monitor, rescuers may be able to see the real time heart rate of the user in the medical info section of the website. When the user's pulse exits the safe range, a medical panic may be automatically triggered and the website may flash red, indicating that the user's pulse has reached a dangerous level. This may be displayed on the front page in the panic status section of the website, regardless of whether the rescuer has navigated to the medical info section of the website. Therefore, when the user's pulse reaches a dangerous threshold, the user's pulse monitor status may be forced to the front of the website to instantly notify all rescuers of the user's current pulse status.

If the user wears the designated brain wave monitor, rescuers may be able to see if the user is having a seizure, a stroke, or many other brain conditions. The brainwave monitor may automatically send the user's current brain status to the website, so rescuers may understand the nature of the user's brain related issue. In addition to the visual brainwave monitor, a basic text description of the user's brain-related condition may be shown next to the brainwave monitor. As with the pulse monitor described above, if the user is experiencing a brain related crisis, a medical panic may be automatically triggered, and this issue may be automatically diagnosed with the preliminary assessment displayed in the panic status section of the website, and the applicable visual monitor may be automatically pushed to the front page of the website, regardless of whether or not the site viewer selects medical info.

If the user wears the optional breathing monitor, rescuers may be able to determine whether or not the user is breathing, in the medical info section of the website. If there is an indication that the user has stopped breathing, or is not breathing within a safe range, a medical panic may be triggered and the user's breathing status may be pushed to the front of the website.

If the user has injected the designated nano blood probes, the rescuers may determine whether or not the user's vital blood levels are normal, including whether or not the user's blood reveals the need for a new dose of essential medication. This information may be shown on the website in the medical info section, and if the situation becomes urgent, the front of the website may be notified with the current urgent status. The multiple blood probe monitors, which may be roughly the size of red blood cells, may continue to travel throughout the user's blood stream until they are removed with a doctor's assistance. The blood probes and other optional accessories are detailed below.

If the user needs a dose of essential medication while the user is wearing the designated transdermal medicine distribution patch, the users who have been instructed by their doctors to receive regular doses of prescribed medicine may be able to program the medicine distribution patch to release a predetermined dosage at predetermined time intervals. The user may also be able to have medicine automatically administered if the blood probes determine that a new dose is unexpectedly needed, and the blood probes communicate with the medicine patch, instructing it to release the correct dose of medicine to the user, which is distributed through the user's skin. The website may inform rescuers of the user's situation regarding their medicine in the panic status section of the website and also in the medical info section on the website.

In certain embodiments, a medicine dispersal and containment chamber may be surgically implanted in the user. When the blood probe determines that the user urgently requires large doses of the medicine in question, (such as the commonly large doses needed for anti epileptic seizures) the medicine distribution chamber may release the designated amount of the drug. The chamber may be surgically positioned so that the refill entrance may be readily accessible beneath the skin. The doctor may inject the refill of the medicine directly through the user's skin, into the distribution chamber. If, for instance, a user suffers from severe epileptic seizures, when the brainwave monitor determines that a seizure has begun, the brainwave monitor signals the ULP application, and from the smart phone, the application may direct the proper dose of medicine to be released from the implanted large dose medicine distribution chamber. When the chamber releases the medicine, the user's medicine status may be displayed in large type font at the top of the home screen of the website, informing all rescuers. Also, if the user's medicine status is in crisis, this info may be sent via SMS and email to all designated contacts.

In certain embodiments, two portable pads may adhere to the user's chest with an adhesive and also may cling to the user's chest via flexible straps which go fully around the user's body in order to hold the pads in the correct place. The pads, which contain sensors and local CPU processing capabilities to receive and interpret the sensor readings, may be able to discern whether or not they are correctly fastened to the person's chest, and are also able to detect the user's heart rate at all times. When the heart stops beating, the sensors may recognize this, a medical panic may be automatically triggered, and the pads may administer the correct amount of electrical impulse to defibrillate the user's heart. The process may automatically cease as soon as the sensors determine that a safe heart rate has been restored. The user's heart is monitored on the main home screen of the rescue website automatically as soon as the irregular heart-related issue is discovered by the heart sensor/pads. In addition to the visual heart monitor on the website, a basic text description of the user's medical issue may be shown on the front of the website, along with a visual monitor of the user's heart functions. All defibrillation activity may be listed in the panic status section of the website.

In certain embodiments, trained personnel may be utilized and may be prepared to receive a panic signal via methods such as SMS or email from any user, at any hour, on any day, from the rescue center. These trained personnel may await the panic messages from multiple computer centers, located hundreds of miles apart throughout North America. This may be used for continuous service in case a severe local disaster strikes, potentially causing one particular rescue center to lose power. If power is lost in one or even several regional rescue centers, rescue service may not be disrupted because distantly located redundant centers may seamlessly continue to provide service. In certain embodiments, the rescue personnel may be instructed to adhere to the following guidelines:

A) When any panic message is received, rescuers first must click on the user's unique web link within the panic message, bringing them to the user's rescue website.

B) Upon arriving at the website, rescuers should immediately begin listening to streaming audio from the scene, and if available, video and or photos. If it is impossible to discern any information useful in determining the severity of the user's situation, the rescuer should contact the nearest rescue precinct to the user, with the correct phone number for this precinct automatically provided on the header of the user's website. After the user's own location is determined, the nearest police and ambulance is displayed, with their contact info.

C) The rescuer tells the local rescue dispatcher that the user is in potentially life threatening danger, and provides them with the user's unique location and information website, "www.LocateLovedOne.com/[UNIQUE USER NAME]". The local professional rescue precinct may be instructed to find and rescue the user immediately using the Internet website.

D) After notifying the local police precinct, designated rescuers remain available to communicate with the user's emergency contacts via multiple ways including the chat text, SMS, audio and/or video section on the home screen of the rescue website, described earlier.

E) The rescue center may maintain continuous communications with the public rescue dispatcher throughout the crisis and may relay all status updates to the designated contacts including campus security if applicable.

F) In cases where the user is able to speak freely, under no duress, if the user wishes, they may call the rescue center directly, and the rescue center may connect the user's phone call as with a conference call, as detailed herein, so the user can simultaneously speak with the rescue center, the local 911 precinct, and possibly with the user's parent, guardian or other loved one if the user suggests it to the rescue center. If the user initially believes that it is safe to place a phone call to the rescue center and rescuers, but suddenly learns that it is not safe for this conference call to be audible, there is a large "MUTE" button on the user's screen during the call. When any participant selects mute, all audio from that participant's computer is silenced, and all other website attendees can see that this participant has silenced their audible audio. To be clear, if the user selects mute as described, audio from the user may still continues to be recorded and to stream to the website where it may be stored for current and or later use. Therefore, when the user selects mute, they are silencing audible audio from being heard in their present location, from the user's smart phone sound speaker. When this mute mode is activated, as normal during panics, sound from the user's position may be discreetly transmitted to and recorded on the website for rescuers to examine in near-realtime, and also at a later time.

G) If the rescue center receives a "False Alarm Message", or if the user cancels the panic, the rescue center is directed to immediately call the user's cell phone, to confirm that the user is safe. If the rescue center determines that the user is safe, all emergency contacts and 911 may be immediately notified by the rescue center.

H) If the rescuer is able to reach the user via phone call, the rescuer may ask the user to say their password. If the user says the correct password, the local public rescue precinct may be immediately notified that the user is now safe, and no longer in need of professional rescue services.

I) If the user gives the designated false password, the rescuer notifies the public rescue precinct that the user is attempting to deceive an attacker by pretending to cancel a panic, but in reality, the user has purposely given the designated false password, indicating that the user may be under duress and may be attempting to deceive an attacker into believing that the user is canceling the panic mode. In reality, the rescuers may continue to monitor data streamed from the user and to search for and rescue the user. Therefore, if the user enters a wrong password, the panic is not canceled, and the user is prompted to enter the correct password. Only when the user enters the designated false password do the actions described above take place.

In certain embodiments, the present invention may include the flexible bracelet mentioned above. This flexible bracelet device may contain at least one of sensors which constantly monitor information including the user's pulse, accelerometer data and audio via an attached microphone. If the user's pulse stops or becomes dangerously irregular, the bracelet may send a signal via Bluetooth® or other wireless method to trigger a medical panic on the user's phone. From the website, the rescuers may view the user's pulse via a visual pulse monitor which may appear on the front of the website if the user's pulse enters a dangerous range. If the user's pulse is within a normal range but the user suddenly finds themselves in a dangerous crisis, they can press the panic trigger button attached to the bracelet the designated number of times at least twice, in order to trigger a panic. In addition to sensors which may detect the user's pulse rate, the pulse monitor sensors also may detect whether or not the monitor is being worn correctly by the user. In other words, if the user removes the pulse monitor from their wrist, no medical panic is triggered, because the device may detect that it is no longer correctly positioned on the user's wrist.

In certain embodiments, the present invention may include a flexible elastic device meant to be worn on the user's head, containing electrodes which constantly monitor the user's brain activity. If the user has frequent seizures, for instance, when the user begins to have a seizure, the brainwave monitor may send a signal via Bluetooth® or other wireless method to the user's smart phone to trigger medical panic, and to display the user's real time brainwaves for medical personnel to study, to better understand the nature of the brain-related crisis. On the main screen of the website, in large letters, it may be displayed that the user is currently having a seizure. The brainwave monitor may detect all brain-related crises such as stroke, blunt impact or seizure, and may automatically trigger a medical panic. Medical professionals may view the user's brain waves in order to better understand the type and severity of the brain issue. The sensors on the brainwave monitor also may detect whether or not the monitor is being worn correctly by the user. Therefore, if the user removes the brainwave monitor from their head, no medical panic may be triggered, because the device has determined that it is no longer correctly positioned on the user's head. If the user's brainwaves are safely within a normal range, but the user suddenly finds themselves in a dangerous crisis, they may press the panic button the designated number of times more than twice, which may be attached to the side of the brainwave monitor hat, and a panic may be triggered. Therefore, as with other optional accessories, an alternate panic trigger device may be contained on this accessory.

In certain embodiments, the present invention may include a breathing monitor as mentioned above. The breathing monitor may rest in the user's shirt pocket and remain in place with a sturdy metal clip. If the user stops moving/breathing, the device may send a medical panic signal to the user's smart phone. The user's breathing status may be shown on the front of the website if the breathing is dangerously abnormal or absent. The breathing monitor may contain sensors which are able to detect whether or not the monitor is correctly positioned on the user. If the user removes the breathing monitor, no panic may be triggered because the device may detect that it is not being worn. If the user is breathing normally, but they suddenly find themselves in a dangerous crisis, the user may double-press the small panic trigger button which resides on the breathing monitor and a panic is triggered.

In certain embodiments, numerous nano blood probes may be surgically implanted into the user's bloodstream. When, for instance, the blood probes sense that the user may be in need of large doses of a certain medicine, (such as anticonvulsant medicine to treat a seizure) the surgically implanted medicine distribution chamber may release the drug using a similar mechanical procedure as the transdermal medicine distribution patch. Namely, the medicine reservoir may remain sealed within the chamber until the robotic levers release the medicine directly into the user's bloodstream when it receives the designated instruction from the blood probes, brainwave monitor, other related health accessories, or at a predetermined time. If a doctor wishes to schedule a time for the medicine to be released, the user and doctor may interface with the device and program the desired instructions. The chamber may be surgically positioned so that the refill entrance may be readily accessible near the surface of the user's skin. The doctor may inject the refill of the drug directly through the user's skin, into the distribution chambers. There may be multiple, separate chambers designed to house different medicines, all separate from each other, and all sealed off from the user's bloodstream until the user needs them. The material surrounding the reservoir may respond to the injection by forming a seal over the newly punctured hole. This is done to prevent medicine from seeping into the user's blood stream until it is desired. Therefore, after an injection is carried out, the puncture caused by the injection may be automatically re-sealed, to prevent any medicine from escaping the medicine reservoir until the chamber receives the command from the user and doctor. As an example, if the user in question is allergic to bee stings, when the blood probe determines that the user has been stung by a bee, the probe may signal the ULP application, and from the smart phone, the application may direct the proper dose of epinephrine to be released from the implanted medicine chamber. The chamber may include several sub-chambers, which may each contain different medicines to be released on different schedules. For instance, one chamber may contain epinephrine, and 4 chambers may contain insulin. Regarding the power for the device, as with the blood probes, the medicine chamber may be recharged with a wireless platform. When the battery runs low on the chamber, the chamber may send a signal to the user's phone, directing the user's phone to automatically send an SMS and email to the user in order to inform the user and doctor that it may be necessary to recharge the medicine chamber. The user may hold the charging platform near the location of the implanted device, and when the charge is complete, the chamber may instruct the user's phone to send the user an SMS and email on their smart phone, which may notify the user that the charge is complete. When the blood probes or other devices direct the chamber to release medicine, the user's medicine status may be displayed on the home screen of the website, informing all rescuers.

In certain embodiments, the present invention may include automatically enabled cardiac defibrillation pads. The two portable pads may stick to the user's chest with an adhesive, and the pads alternatively may be held against the user's chest via elastic straps which may firmly hold the pads in place. The pads, which contain sensitive sensors and local CPU processing capabilities to receive and interpret the sensor readings, may automatically detect whether or not they are correctly fastened to the person's chest, and also may be able to detect the user's heart rate. If the user's heart stops beating, the sensors may detect this and the pads may administer the correct amount of electrical impulse to defibrillate the user's heart. The process may automatically cease as soon as the sensors determine that a safe heart rate has been restored. A medical panic may be triggered and all heart information may be pushed to the front of the rescue website. The pads may be recharged with the wireless charging pad.

The ULP nano-blood-probes, as mentioned above, may circulate through the user's body continuously until removed. The probes may be roughly 5 micrometers in length, slightly smaller than standard red blood cells. The devices may be constructed with carbon atoms in a diamond pattern to maximize their strength. They may contain CPU, robotic arms capable of grasping and analyzing various cells and other objects; with sensors capable of detecting the presence and concentration of any physical substance. The probes may be able to seek out and destroy certain designated cells with at least one of a robotic drill, a vise, an electrical shock, the delivery of a particular substance to a designated cell, among other techniques which may be used in order to destroy cells such as cancer cells, designated bacteria, designated viruses and any designated microbes as directed by the user and their authorized medical advisors. In addition to recharging the battery via the magnetic charging pad, the blood probes may have the ability to harness energy present in glucose in the user's bloodstream. The probes may at least partially replenish their batteries by converting the available blood glucose into usable electricity.

After injecting the blood probes, the user's blood levels may be constantly monitored by the probes to ensure that proper levels of all substances are within healthy ranges. If, for instance, the user requires a steady dose of medicine to prevent the onset of psychotic symptoms if the user suffers from severe Schizophrenia, when the blood probes detect that the user's blood may be running low on the designated medicine, the probes may send a signal to the user's phone, which then may signal the user's medicine distribution patch or the implanted large dose medicine distribution chamber to administer the appropriate dose of medicine into the user's bloodstream. The blood probes may wirelessly instruct the surgically implanted large dose medicine distribution chamber to release larger doses of medicine than the transdermal medicine distribution patch may contain and administer. The large dose chamber may also slowly release medicine as is necessary to maintain symptom relief for a user with Schizophrenia, for instance, requiring fewer refills than the transdermal medicine patches.

The blood probes may constantly monitor all key blood levels, and if a crisis is detected because, for instance, the user's oxygen or insulin levels are dangerously low, the probes may send a signal to the user's phone, which then triggers a medical panic, notifying all emergency contacts that the user is having a medical crisis. The known details of the crisis as determined by the probes may be sent to the rescue clearinghouse in order for rescuers to understand the nature of the emergency. In certain embodiments users and doctors may interface with and recharge the blood probes by using the wireless charging and interface device in addition to the conversion of blood glucose mentioned above.

To charge the battery contained within the wireless charging pad, it may be plugged into a wall outlet. Once the charging pad's battery is full, the user may bring the charging pad with them in a mobile fashion, enabling the user to recharge and/or interface with the blood probes and other accessories while they are away from stationary power. It may also be possible to use the charger/interface pad when the battery fully depletes if the pad is plugged into the wall outlet.

The blood probes may be magnetized to the opposite polarity of the charging/interface pad, hence, when the probes arrive at the user's arm during normal blood circulation, and the user's arm is resting on the charging and interface pad, the probes may remain stationary when they reach the magnetic field from the charging interface pad. While the probes remain suspended in the magnetic field, the probes may be recharged and may also be reprogrammed with new instructions by the user and their doctor.

The charging and interface pad may link via WIFI or other wireless means to a computer terminal through a secure web portal, with which the user and doctor may be able to transmit new instructions to the probes, as the batteries are being recharged. When the power has been fully restored, the probe may send a signal to the user's phone via the charging pad. When the user's phone receives this signal, an SMS may be sent to the user's phone along with the designated medical contact, to notify them that the probes have been successfully recharged, and when applicable, when the probes have successfully received the new instructions.

With the transdermal medicine distribution patches, users who may have been instructed by their doctors to receive regular doses of prescribed medicine may program the patches to release a predetermined dosage after predetermined time intervals. The patches may be attached to the user's skin via an adhesive 138, and once correctly attached, the patches may remain in place even if the user enters water. As illustrated in FIG. 37, before the patch has been instructed to distribute the medicine, the medicine shield 140 may block the medicine reservoir 142, from contacting the skin. As illustrated in FIG. 38, when the user and their doctor instruct the medicine shield 146 to move to the side on the motorized levers, the medicine reservoir 142 may be directly exposed to the user's skin 144 where the medicine is absorbed into the skin at the predetermined dosage. After the desired amount of medicine has been dispersed, the motorized levers may re-seal the medicine shield 140 blocking further absorption. For example, with a Schizophrenic patient whose doctor prescribes a steady dosage of a medicine, the medicine distribution patch may automatically withhold and release medicine transdermally, according to the instructions entered by the doctor.

The user and doctor may issue instructions for the transdermal medicine distribution patch through the user's individual web page such as, "www.LocateLovedOne.com/[UNIQUE USER NAME]". The following may include example instructions on how to use the patch:

A) The user and doctor, or anyone who may wish to modify the medicine distribution settings, may prove that they are authorized to modify these settings by being subjected to multiple layers of password security.

B) After the correct passwords have been entered, the user and doctor may determine the dosages to be released after the appropriate time intervals, or alternatively to instantly release medicine upon detecting the onset of designated symptoms.

C) The doctor fills the drug reservoir for each patch. Users may utilize multiple patches if there is enough skin available for patches without excessive amounts of body hair. The drug reservoirs may be refilled while they are still adhered to the user's skin, and may also be refilled before the user attaches the patches.

D) Users may recharge the batteries in the patches without removing them from their skin by holding the wireless charging pad next to each patch until the patch sends an SMS to the user's phone, which may notify the users that the devices have been fully charged.

E) The transdermal patches may be designed so that the medicine is kept in a separate compartment from the user's skin until it is needed. Therefore, the medicine may not make contact with the user's skin until the user has decided for their skin to make contact, and programmed the device to release the medicine at the desired times and under the designated detected circumstances via the user's unique web page, such as: www.LocateLovedOne.com/[UNIQUE USER NAME]

When the patches receive an instruction to administer the medicine, a thin barrier may slide to the side, enabling the drug reservoir to make contact with the user's skin. Multiple compartments may be available with separate sliding barriers, so the medicine may be deliberately administered in a staggered fashion, at whichever schedule the user and doctor may have chosen via the web portal above. In certain embodiments, the patches may interface with the ULP application, website, emergency contacts and the rescue center. For example, the patches may do the following:

A) When all doses are administered, the patches may send a signal to the user's cell phone, and the ULP application may notify emergency contacts, the website and the rescue center that the medicine has been successfully administered.

B) After any dose is administered, the current remaining amount of medicine in the drug reservoirs may also be transmitted to the website. When the sensors in the drug reservoirs determine that a refill is urgently necessary, the patches may trigger a medical panic, alerting all emergency contacts and the rescue center of the situation regarding the medicine.

C) If the patch malfunctions and does not successfully administer the medicine, a medical panic may be triggered and the malfunction may be described on the front of the website.

In certain embodiments, when users and doctors instruct the blood probes to assess levels of an important substance, and that substance has fallen below safe levels, the blood probe may signal the ULP application which then may signal the medicine distribution skin patches to release the desired dosage of the medicine in question, directly through the user's skin via the skin patches. For example, the sequential actions may include the following:

A) Blood probe determines that the user is in need of a dose of the medicine available in the skin patch.

B) The blood probe notifies the ULP application.

C) The user's smart phone signals the patches via Bluetooth® or other wireless method, instructing it to administer the correct dose of medicine.

D) When the blood probes observe that the optimal levels of the drug have entered the blood stream, the patch sliding barrier closes, sealing off the drug from the user's skin.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention.

What is claimed is:

1. A method comprising:
   obtaining, at a mobile device that is communicatively coupled to a finger-worn ring, a signal indicating an event, wherein the signal indicating the event is generated by at least one of the mobile device or the finger-worn ring;
   in response to obtaining the signal indicating the event, obtaining information corresponding to the event based on examining the signal, including at least one of
   (i) determining a type of a user interaction of a plurality of available user interactions of different types with an input mechanism on the finger-worn ring,
   (ii) determining that the mobile device is entering or exiting a designated boundary at, before or after a specified time, or
   (iii) determining that the mobile device does not enter or exit a designated boundary at a specified time,
   wherein different sequences of actions are triggered depending on the determined type of user interaction;
   conditioned on determining that the type of the user interaction corresponds to a first type of user interaction of the plurality of available user interactions of different types:
   identifying a current mode of operation of an application that is associated with the finger-worn ring and executed on the mobile device,
   upon identifying the current mode of operation of the application as a first mode, transmitting the information corresponding to the event to at least one of a preselected remote network server or one or more preselected information recipients, and
   upon identifying the current mode of operation of the application as a second mode that is distinct from the first mode, transmitting the information corresponding to the event to one or more of the preselected information recipients;
   conditioned on determining that the type of the user interaction corresponds to a second type of user interaction of the plurality of available user interactions of different types, transmitting the information corresponding to the event to the preselected remote network server irrespective of the current mode of operation of the application;
   conditioned on determining that the type of the user interaction corresponds to a third type of user interaction of the plurality of available user interactions of different types, transmitting a medical alert to the preselected remote network server and one or more of the preselected information recipients, irrespective of the current mode of operation of the application;
   conditioned on determining that the type of the user interaction corresponds to a fourth type of user interaction of the plurality of available user interactions of different types:
   causing a speaker coupled to the mobile device to generate an audible alert, wherein the audible alert includes a loud spoken warning that states that at least one of video, audio, images or location data corresponding to the event has been successfully transmitted to a public authority, and
   transmitting the information corresponding to the event to one or more of the preselected remote network server and the preselected information recipients irrespective of the current mode of operation of the application; and
   conditioned on determining that the type of the user interaction corresponds to a fifth type of user interaction of the plurality of available user interactions of different types, canceling a scheduled transmission of the information corresponding to the event to the preselected remote network server,
   wherein at least one of medical information, location data, audio, video or image is recorded using at least one of the mobile device or the finger-worn ring, including continuously transmitting at least one of the audio, video, image, location data or medical information of the user to the remote network server for a duration of the event,
   wherein upon a user-initiated recording of one or more of the audio, video, image, location data or the medical information while no event is occurring, a corresponding recording is stored in local storage of the mobile device, and
   wherein at least one of the locally stored audio, video, image, location data or the medical information recorded prior to an event occurrence is transmitted to the remote network server upon receiving a signal indicating an event.

2. The method of claim 1, wherein the information corresponding to the event includes a present location of the mobile device, the method further comprising:
   determining, by the mobile device, the present location of the mobile device; and
   transmitting the present location of the mobile device as part of the information corresponding to the event.

3. The method of claim 1, further comprising:
   upon a parameter corresponding to the stored recording of one or more of the audio, location data or the medical information reaching a predetermined threshold value, overwriting, in the local storage of the mobile device, previously stored audio, location data or medical information with a most recent recording of one or more of the audio, location data or the medical information,
   wherein the overwriting ceases in response to one of (i) obtaining the signal indicating the event, or (ii) receiving a user input to stop the recording; and
   in response to obtaining the signal indicating the event, transmitting, to one or more of the preselected remote network server and the preselected information recipients, (i) at least one of the audio, location data or the medical information stored in local storage of the mobile device prior to obtaining the signal indicating the event, and (ii) at least one of the location data, medical information, audio, video or image recorded subsequent to obtaining the signal indicating the event.

4. The method of claim 1, wherein at least one of transmitting the information corresponding to the event or transmitting the medical alert comprises transmitting one or more of real-time medical information about the user, or a medical history of the user.

5. The method of claim 1, further comprising:
obtaining health information about a user using the finger-worn ring, wherein obtaining the health information comprises one or more of:
monitoring at least one of a pulse, an activity level, or a blood pressure of the user,
performing at least one of a sweat analysis or a sleep analysis of the user, or
measuring a pedometer statistic of the user.

6. The method of claim 1, wherein information about the preselected information recipients is stored on the mobile device, and wherein transmitting the information corresponding to the event to one or more of the preselected information recipients comprises:
determining that the user interaction of the first type does not correspond to cancellation of the transmission of the information corresponding to the event; and
in response to identifying the current mode of operation of the application as the second mode and upon determining that the user interaction of the first type does not correspond to cancellation of the transmission of the information corresponding to the event, performing operations comprising one or more of:
generating a ringing tone simulating an incoming phone call to the mobile device, or
transmitting, to one or more of the preselected information recipients, information indicating that the event does not correspond to a physical danger.

7. The method of claim 1, wherein the input mechanism comprises a button coupled to the finger-worn ring, and wherein determining the type of the user interaction with the input mechanism of the plurality of available user interactions of different types comprises:
determining a number of presses of the button by the user.

8. The method of claim 1, wherein the finger-worn ring is in sleep mode prior to obtaining the signal indicating the event and the input mechanism comprises a microphone coupled to the finger-worn ring, and wherein obtaining the signal indicating the event comprises:
detecting a user press of a button of the finger-worn ring;
in response to detecting the user press of the button, waking the finger-worn ring from the sleep mode;
following waking the finger-worn ring from the sleep mode, detecting, using the microphone, utterance of a preselected verbal phrase of a plurality of preselected verbal phrases;
identifying a user interaction of the plurality of available user interactions of different types corresponding to the uttered preselected verbal phrase; and
associating the identified user interaction with the signal indicating the event.

9. The method of claim 1, wherein the preselected remote network server is associated with a rescue center at which at least one of the user or the mobile device is registered, the method further comprising:
receiving, at the rescue center, additional information corresponding to the event;
examining, by the rescue center, the additional information corresponding to the event; and
in response to examining the additional information corresponding to the event, performing, by the rescue center, at least one of:
transmitting the additional information corresponding to the event to one or more of the preselected information recipients, or
transmitting the additional information corresponding to the event to a public authority.

10. The method of claim 1, further comprising storing, in the mobile device, information corresponding to a boundary identifying a geographic region and a specified time during which the mobile device is expected to be within the boundary, and wherein the method comprises:
monitoring whether the mobile device is within the boundary at the specified time; and
in response to the monitoring, transmitting an alert to one or more of the preselected remote network server or the preselected information recipients based on detecting at least one of:
the mobile device is within the boundary at, before or after the specified time,
the mobile device is outside the boundary at, before or after the specified time,
the mobile device is exiting the boundary at, before or after the specified time,
the mobile device is entering the boundary at, before or after the specified time,
the mobile device is not exiting the boundary at the specified time, or
the mobile device is not entering the boundary at the specified time.

11. The method of claim 1, further comprising storing, in the mobile device, at least one of a specified location or a specified time, and wherein the method comprises:
monitoring whether the mobile device is at the specified location at the specified time;
conditioned on detecting that the mobile device is arriving at or departing from the specified location at, before or after the specified time, transmitting a first alert to one or more of the preselected remote network server or the preselected information recipients; and
conditioned on detecting that the mobile device has not arrived at the specified location or departed from the specified location at the specified time, transmitting a second alert to one or more of the preselected remote network server or the preselected information recipients.

12. A system comprising:
a finger-worn ring that includes an input mechanism configured to process an interaction by a user associated with the finger-worn ring, the ring configured to generate a non-telephonic signal indicating an event in response to processing the interaction by the user; and
a mobile device that is communicatively coupled to the finger-worn ring, the mobile device configured to:
obtain a signal indicating an event, wherein the signal indicating the event is generated by at least one of the mobile device or the finger-worn ring;
in response to obtaining the signal indicating the event, obtain information corresponding to the event based on examining the signal, including at least one of
(i) determining a type of a user interaction of a plurality of available user interactions of different types with an input mechanism on the finger-worn ring,
(ii) determining that the mobile device is entering or exiting a designated boundary at, before or after a specified time, or
(iii) determining that the mobile device does not enter or exit a designated boundary at a specified time,
wherein different sequences of actions are triggered depending on the determined type of user interaction;
conditioned on determining that the type of the user interaction corresponds to a first type of user interaction of the plurality of available user interactions of different types:

identify a current mode of operation of an application that is associated with the finger-worn ring and executed on the mobile device, upon identifying the current mode of operation of the application as a first mode, transmit the information corresponding to the event to at least one of a preselected remote network server or one or more preselected information recipients, and upon identifying the current mode of operation of the application as a second mode that is distinct from the first mode, transmit the information corresponding to the event to one or more of the preselected information recipients;

conditioned on determining that the type of the user interaction corresponds to a second type of user interaction of the plurality of available user interactions of different types, transmit the information corresponding to the event to the preselected remote network server irrespective of the current mode of operation of the application;

conditioned on determining that the type of the user interaction corresponds to a third type of user interaction of the plurality of available user interactions of different types, transmit a medical alert to the preselected remote network server and one or more of the preselected information recipients, irrespective of the current mode of operation of the application;

conditioned on determining that the type of the user interaction corresponds to a fourth type of user interaction of the plurality of available user interactions of different types:

cause a speaker coupled to the mobile device to generate an audible alert, wherein the audible alert includes a loud spoken warning that states that at least one of video, audio, images or location data corresponding to the event has been successfully transmitted to a public authority, and transmit the information corresponding to the event to one or more of the preselected remote network server and the preselected information recipients irrespective of the current mode of operation of the application; and conditioned on determining that the type of the user interaction corresponds to a fifth type of user interaction of the plurality of available user interactions of different types, cancel a scheduled transmission of the information corresponding to the event to the preselected remote network server, wherein at least one of medical information, location data, audio, video or image is recorded using at least one of the mobile device or the finger-worn ring, including continuously transmitting at least one of the audio, video, image, location data or medical information of the user to the remote network server for a duration of the event, wherein upon a user-initiated recording of one or more of the audio, video, image, location data or the medical information while no event is occurring, a corresponding recording is stored in local storage of the mobile device, and wherein at least one of the locally stored audio, video, image, location data or the medical information recorded prior to an event occurrence is transmitted to the remote network server upon receiving a signal indicating an event.

13. The system of claim 12, wherein the information corresponding to the event includes a present location of the mobile device, and wherein the mobile device is further configured to:

determine the present location of the mobile device; and transmit the present location of the mobile device as part of the information corresponding to the event.

14. The system of claim 12, wherein the mobile device is further configured to:

upon a parameter corresponding to the stored recording of one or more of the audio, location data or the medical information reaching a predetermined threshold value, overwrite, in the local storage of the mobile device, previously stored audio, location data or medical information with a most recent recording of one or more of the audio, location data or the medical information, wherein the overwriting ceases in response to one of (i) obtaining the signal indicating the event, or (ii) receiving a user input to stop the recording; and in response to obtaining the signal indicating the event, transmit, to one or more of the preselected remote network server and the preselected information recipients, (i) at least one of the audio, location data or the medical information stored in local storage of the mobile device prior to obtaining the signal indicating the event, and (ii) at least one of the location data, medical information, audio, video or image recorded subsequent to obtaining the signal indicating the event.

15. The system of claim 12, wherein at least one of transmitting the information corresponding to the event or transmitting the medical alert comprises transmitting one or more of real-time medical information about the user, or a medical history of the user.

16. The system of claim 12, wherein the mobile device is further configured to:

obtain health information about a user using the finger-worn ring, wherein obtaining the health information comprises one or more of:

monitoring at least one of a pulse, an activity level, or a blood pressure of the user, performing at least one of a sweat analysis or a sleep analysis of the user, or measuring a pedometer statistic of the user.

17. The system of claim 12, wherein information about the preselected information recipients is stored on the mobile device, and wherein to transmit the information corresponding to the event to one or more of the preselected information recipients the mobile device is configured to:

determine that the user interaction of the first type does not correspond to cancellation of the transmission of the information corresponding to the event; and in response to identifying the current mode of operation of the application as the second mode and upon determining that the user interaction of the first type does not correspond to cancellation of the transmission of the information corresponding to the event, perform one or more of:

generate a ringing tone simulating an incoming phone call to the mobile device, or transmit, to one or more of the preselected information recipients, information indicating that the event does not correspond to a physical danger.

18. The system of claim 12, wherein the input mechanism comprises a button coupled to the finger-worn ring, and wherein determining the type of the user interaction with the input mechanism of the plurality of available user interactions of different types comprises:

determining a number of presses of the button by the user.

19. The system of claim 12, wherein the finger-worn ring is in sleep mode prior to obtaining the signal indicating the event and the input mechanism comprises a microphone coupled to the finger-worn ring, and wherein obtaining the signal indicating the event comprises:
- detecting a user press of a button of the finger-worn ring;
- in response to detecting the user press of the button, waking the finger-worn ring from the sleep mode;
- following waking the finger-worn ring from the sleep mode, detecting, using the microphone, utterance of a preselected verbal phrase of a plurality of preselected verbal phrases;
- identifying a user interaction of the plurality of available user interactions of different types corresponding to the uttered preselected verbal phrase; and
- associating the identified user interaction with the signal indicating the event.

20. The system of claim 12, wherein the preselected remote network server is associated with a rescue center at which at least one of the user or the mobile device is registered, and wherein the rescue center is configured to:
- receive additional information corresponding to the event;
- examine the additional information corresponding to the event; and
- in response to examining the additional information corresponding to the event, perform at least one of:
  - transmit the additional information corresponding to the event to one or more of the preselected information recipients, or
  - transmit the additional information corresponding to the event to a public authority.

21. The system of claim 12, wherein the mobile device stores information corresponding to a boundary identifying a geographic region and a specified time during which the mobile device is expected to be within the boundary, and wherein the mobile device is further configured to:
- monitor whether the mobile device is within the boundary at the specified time; and
- in response to the monitoring, transmit an alert to one or more of the preselected remote network server or the preselected information recipients based on detecting at least one of:
  - the mobile device is within the boundary at, before or after the specified time,
  - the mobile device is outside the boundary at, before or after the specified time,
  - the mobile device is exiting the boundary at, before or after the specified time,
  - the mobile device is entering the boundary at, before or after the specified time,
  - the mobile device is not exiting the boundary at the specified time, or
  - the mobile device is not entering the boundary at the specified time.

22. The system of claim 12, wherein the mobile device stores at least one of a specified location or a specified time, and wherein the mobile device is further configured to:
- monitor whether the mobile device is at the specified location at the specified time;
- conditioned on detecting that the mobile device is arriving at or departing from the specified location at, before or after the specified time, transmit a first alert to one or more of the preselected remote network server or the preselected information recipients; and
- conditioned on detecting that the mobile device has not arrived at the specified location or departed from the specified location at the specified time, transmit a second alert to one or more of the preselected remote network server or the preselected information recipients.

23. The system of claim 12, wherein the finger-worn ring includes one or more of an electromechanical button that can be pressed by the user, a microphone, a speaker, a video recorder or a health monitor.

* * * * *